(12) United States Patent
Hwang et al.

(10) Patent No.: US 9,681,421 B2
(45) Date of Patent: Jun. 13, 2017

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Jaeho Hwang, Seoul (KR); Woosuk Ko, Seoul (KR); Sungryong Hong, Seoul (KR); Jongwoong Shin, Seoul (KR); Jinwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/902,106

(22) PCT Filed: Jul. 14, 2014

(86) PCT No.: PCT/KR2014/006291
§ 371 (c)(1),
(2) Date: Dec. 30, 2015

(87) PCT Pub. No.: WO2015/008983
PCT Pub. Date: Jan. 22, 2015

(65) Prior Publication Data
US 2016/0143000 A1 May 19, 2016

Related U.S. Application Data

(60) Provisional application No. 61/846,053, filed on Jul. 14, 2013, provisional application No. 61/847,545, filed on Jul. 17, 2013.

(51) Int. Cl.
*H04W 72/00* (2009.01)
*H04L 1/00* (2006.01)
(Continued)

(52) U.S. Cl.
CPC ......... *H04W 72/005* (2013.01); *H04L 1/0042* (2013.01); *H04L 1/0048* (2013.01);
(Continued)

(58) Field of Classification Search
CPC ............ H04W 72/005; H04L 27/2627; H04L 1/0042; H04L 1/0071; H04N 21/6131;
(Continued)

(56) References Cited

U.S. PATENT DOCUMENTS 6,456,782 B1 * 9/2002 Kubota ............ H04N 21/23608
370/394
2011/0167464 A1 * 7/2011 Yun ........................ H04H 20/57
725/114
(Continued)

FOREIGN PATENT DOCUMENTS

EP 2541904 A2 1/2013
EP 2555510 A2 2/2013
(Continued)

*Primary Examiner* — Kenneth Lam
(74) *Attorney, Agent, or Firm* — Birch, Stewart, Kolasch & Birch, LLP

(57) ABSTRACT

A method and an apparatus for transmitting broadcast signals thereof are disclosed. The apparatus for transmitting broadcast signals comprises an input formatter for input formatting one or more data streams into one or more service data, an encoder for encoding the service data, a mapper for mapping the encoded service data onto constellations, a time interleaver time interleaving the mapped service data, a frame builder for building at least one signal frame including the time interleaved service data, a modulator for modulating data in the built at least one signal frame by an OFDM (Orthogonal Frequency Division Multiplex) scheme and a transmitter for transmitting the broadcast signals having the modulated data.

10 Claims, 36 Drawing Sheets

(51) Int. Cl.
*H04N 21/236* (2011.01)
*H04N 21/2362* (2011.01)
*H04N 21/2381* (2011.01)
*H04N 21/2383* (2011.01)
*H04N 21/414* (2011.01)
*H04N 21/434* (2011.01)
*H04N 21/438* (2011.01)
*H04N 21/61* (2011.01)
*H04L 27/26* (2006.01)
*H04B 7/0413* (2017.01)
*H04L 5/00* (2006.01)

(52) U.S. Cl.
CPC ........ *H04L 1/0071* (2013.01); *H04L 27/2627* (2013.01); *H04N 21/2362* (2013.01); *H04N 21/2381* (2013.01); *H04N 21/2383* (2013.01); *H04N 21/23614* (2013.01); *H04N 21/41407* (2013.01); *H04N 21/4345* (2013.01); *H04N 21/4381* (2013.01); *H04N 21/4382* (2013.01); *H04N 21/6131* (2013.01); *H04B 7/0413* (2013.01); *H04L 1/0064* (2013.01); *H04L 1/0072* (2013.01); *H04L 5/00* (2013.01); *H04L 2001/0093* (2013.01)

(58) Field of Classification Search
CPC ........... H04N 21/2362; H04N 21/2383; H04N 21/2381; H04N 21/4381; H04N 21/23614; H04N 21/4382; H04N 21/41407; H04N 21/4345

See application file for complete search history.

(56) References Cited

U.S. PATENT DOCUMENTS

| | | | | |
|---|---|---|---|---|
| 2011/0200128 | A1* | 8/2011 | Ko | H04L 5/0007 375/260 |
| 2011/0286535 | A1* | 11/2011 | Ko | H04L 1/0041 375/259 |
| 2012/0307842 | A1* | 12/2012 | Petrov | H04N 21/23608 370/474 |
| 2012/0327955 | A1* | 12/2012 | Herrmann | H04N 21/235 370/476 |
| 2014/0003540 | A1* | 1/2014 | Okada | H04N 21/44004 375/240.25 |
| 2014/0341103 | A1* | 11/2014 | Hwang | H04W 72/005 370/312 |
| 2015/0163567 | A1* | 6/2015 | Fujita | H04L 65/4076 725/109 |

FOREIGN PATENT DOCUMENTS

| | | |
|---|---|---|
| EP | 2557717 A1 | 2/2013 |
| EP | 2568650 A2 | 3/2013 |
| WO | WO 2010/005416 A1 | 1/2010 |
| WO | WO 2010/143861 A2 | 12/2010 |

* cited by examiner

Fig. 26

| Syntax | bit |
|---|---|
| BB Frame header() { | |
|     Conventional BB Frame header | N bits |
|     NUM_PCR | 4 bits |
|     START_PCR | 6 bits |
|     for ( i=1; i<NUM_PCR; i++) { | |
|         NUM_TSP | 6 bits |
|         NUM_NP | 10 bits |
|     }end | |
| }end | |

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS REFERENCE TO RELATED APPLICATIONS

This application is the National Phase of PCT/KR2014/006291 filed on Jul. 14, 2014, which claims priority under 35 U.S.C. 119(e) to U.S. Provisional Application Nos. 61/846,053 filed on Jul. 14, 2013 and 61/847,545 filed on Jul. 17, 2013, all of which are hereby expressly incorporated by reference into the present application.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE OF INVENTION

Technical Problem

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

Solution to Problem

To achieve the object and other advantages and in accordance with the purpose of the invention, as embodied and broadly described herein, a method for transmitting broadcast signals comprises input formatting one or more data streams into one or more service data, encoding the service data, mapping the encoded service data onto constellations, time interleaving the mapped service data, building at least one signal frame including the time interleaved service data, modulating data in the built at least one signal frame by an OFDM (Orthogonal Frequency Division Multiplex) scheme and transmitting the broadcast signals having the modulated data. And wherein the input formatting further includes, deleting at least one null packet in each of the one or more data streams, wherein the at least one null packets is multiplexed with at least one data packet and inserting DNP (deleted null packet) information indicating a number of the deleted at least one null packet in front of a data packet which follows the deleted at least one null packet.

Advantageous Effects of Invention

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF DRAWINGS

FIG. 26 is a view illustrating syntax of a BB frame header according to an embodiment of the present invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
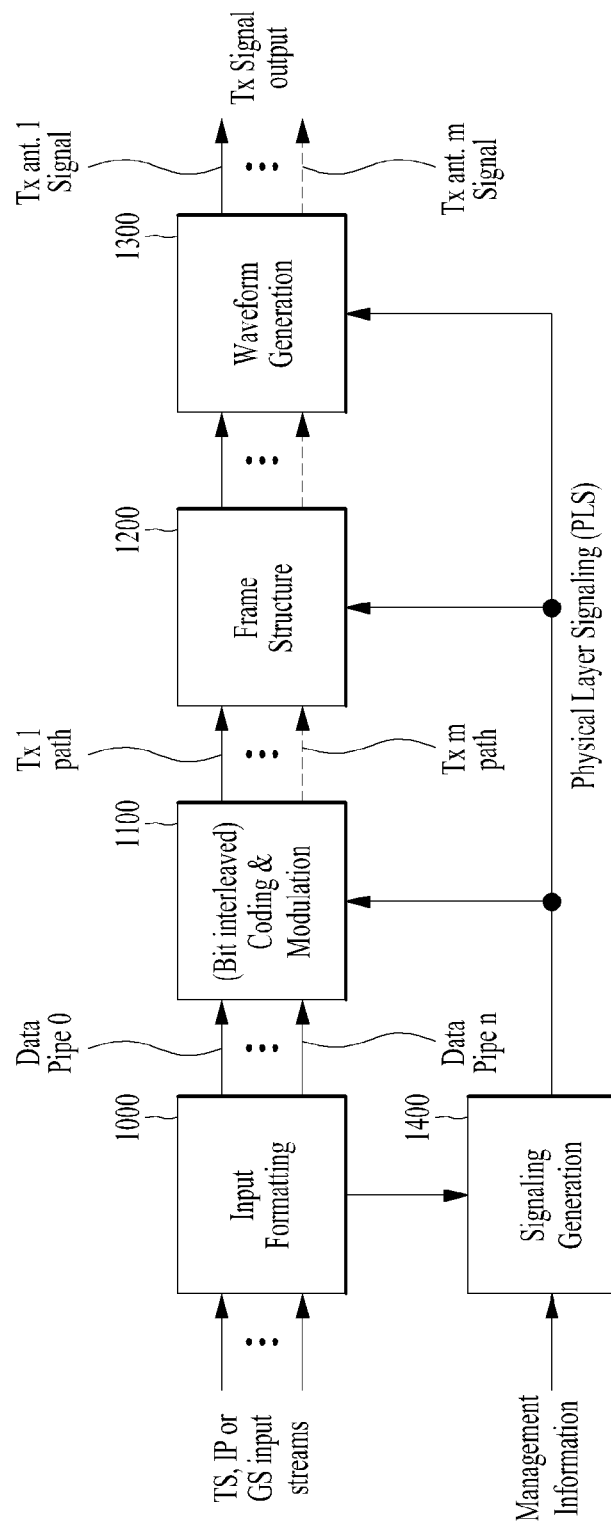
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
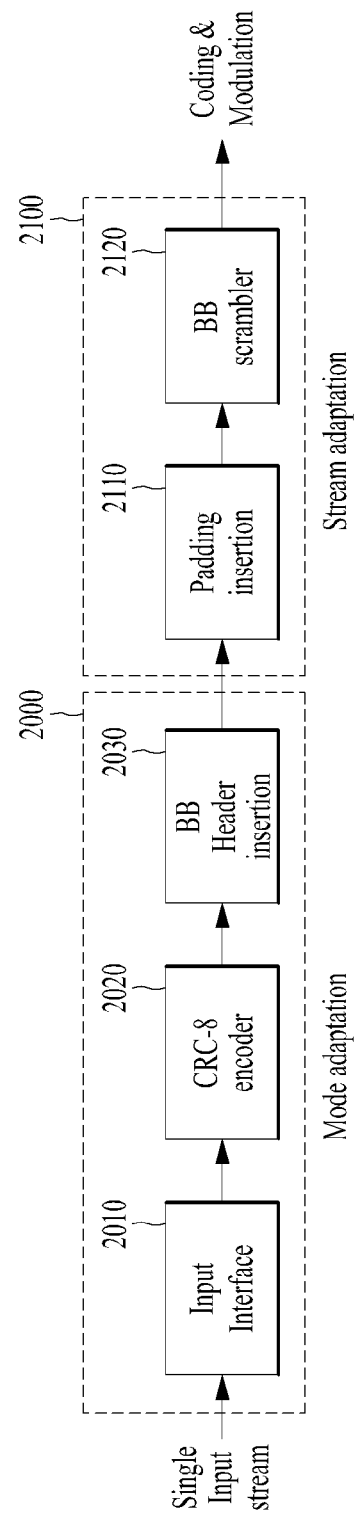
FIG. 2 illustrates an input formatting module according to an embodiment of the present invention.
Figure 3:
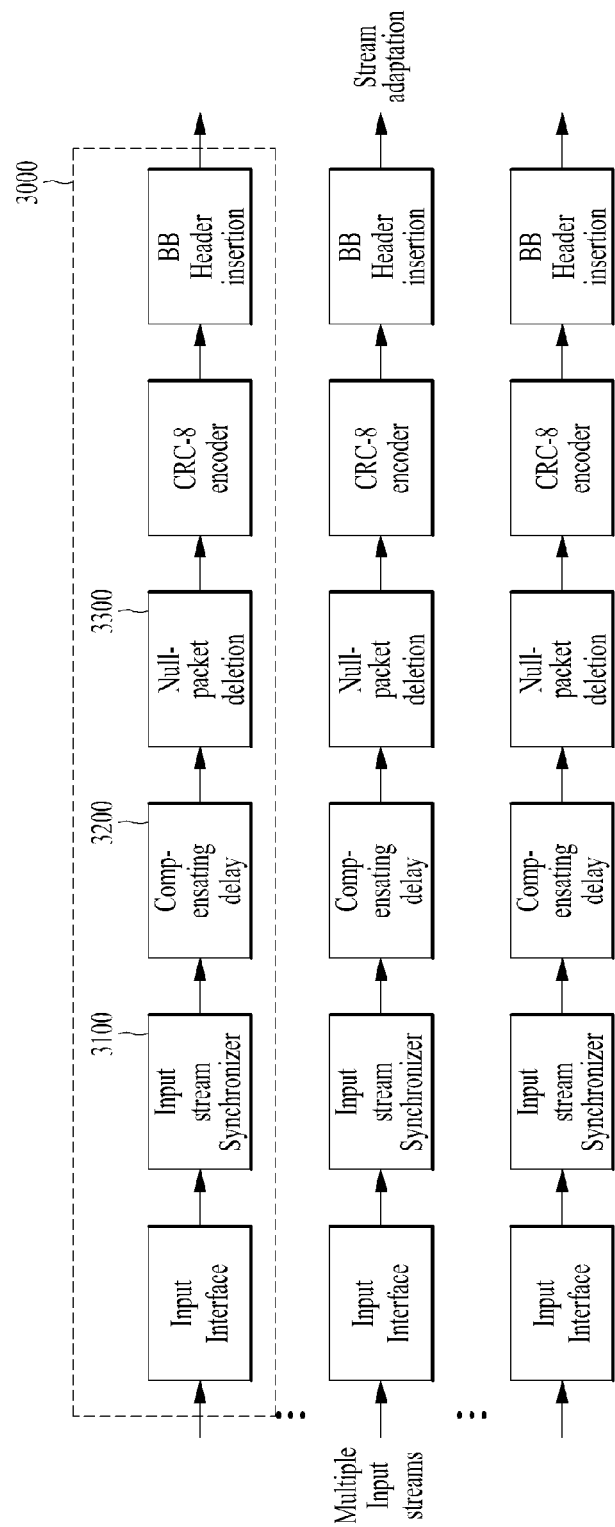
FIG. 3 illustrates an input formatting module according to another embodiment of the present invention.
Figure 4:
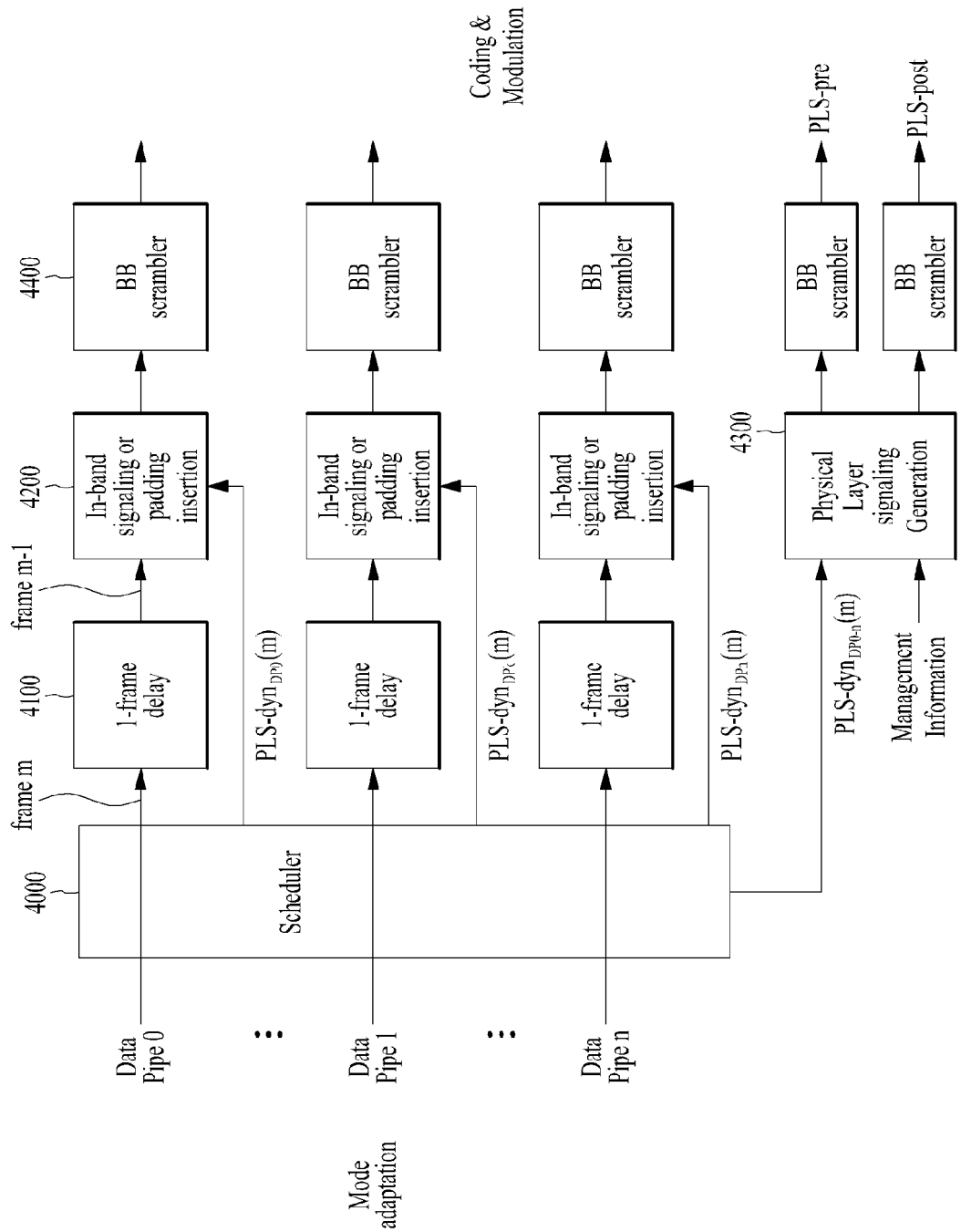
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
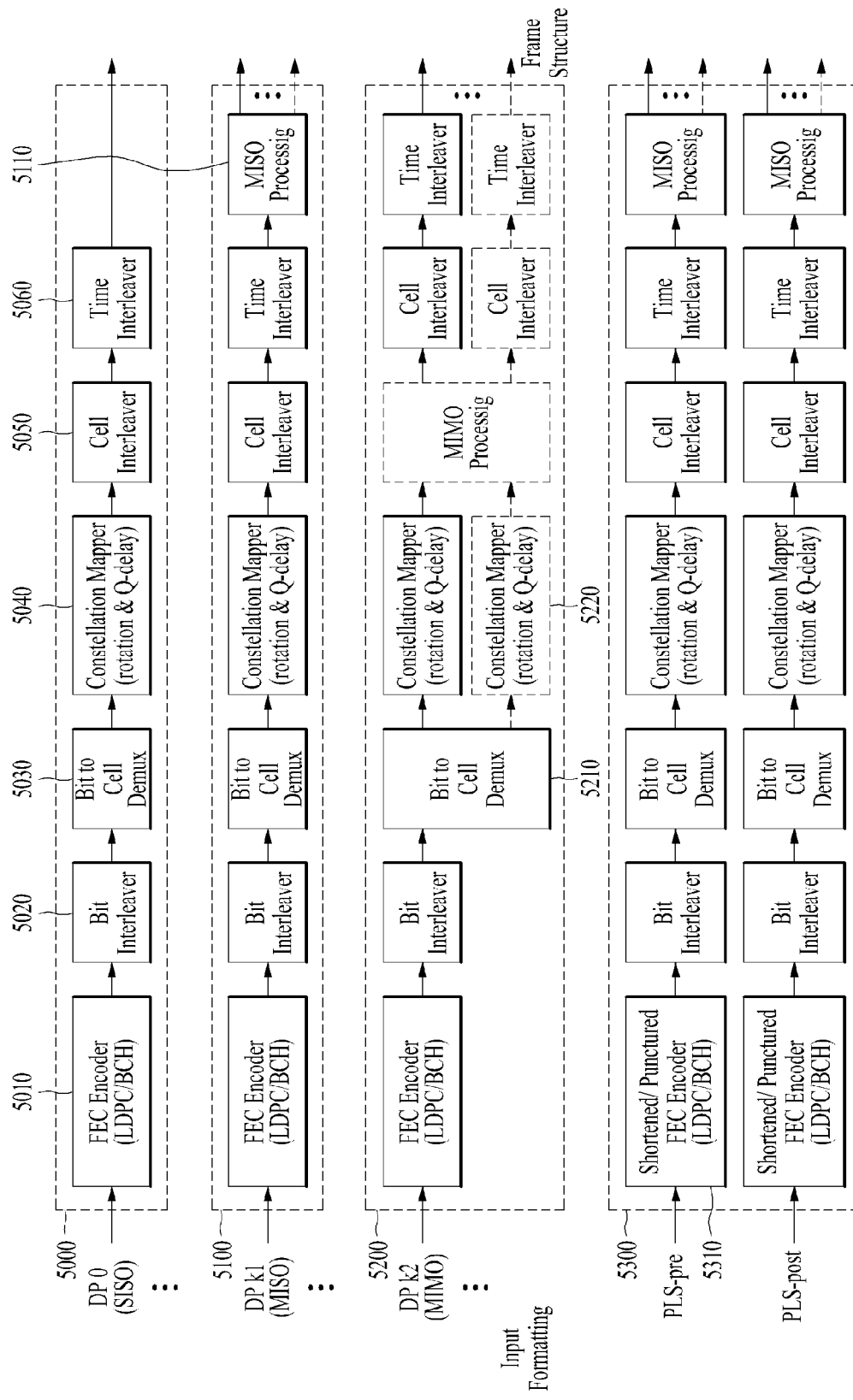
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
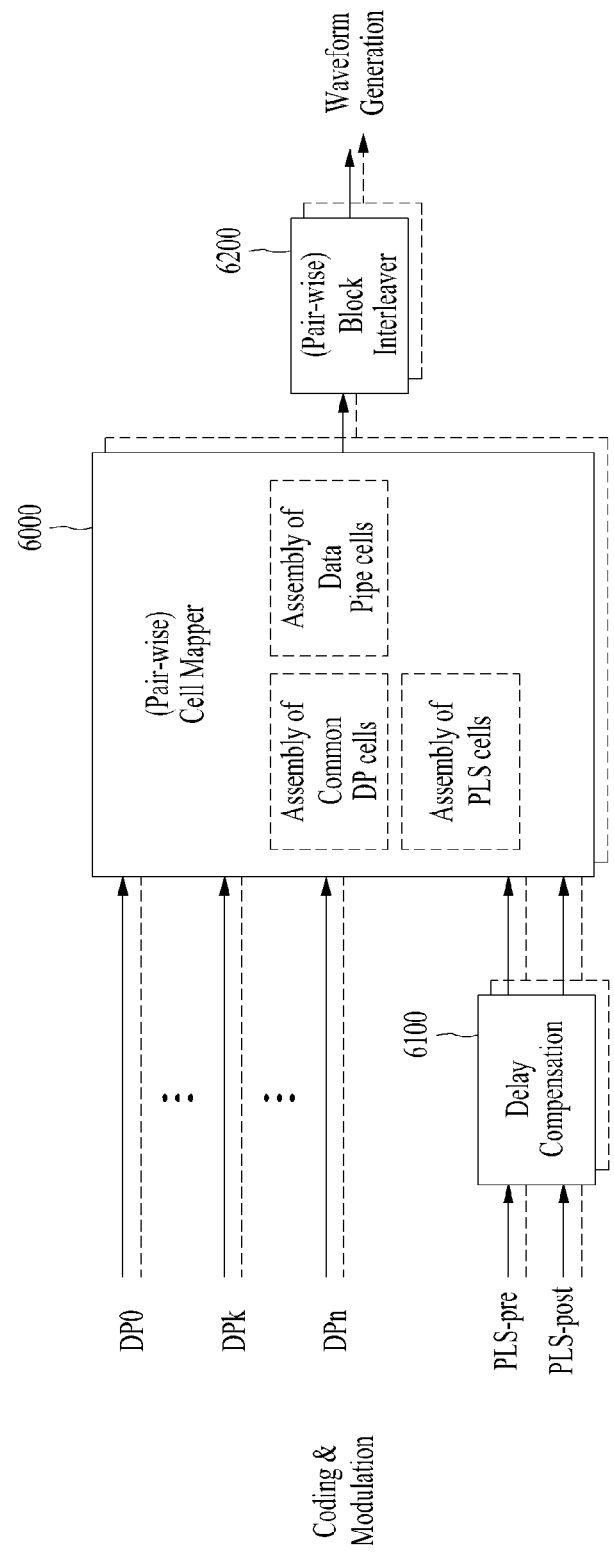
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
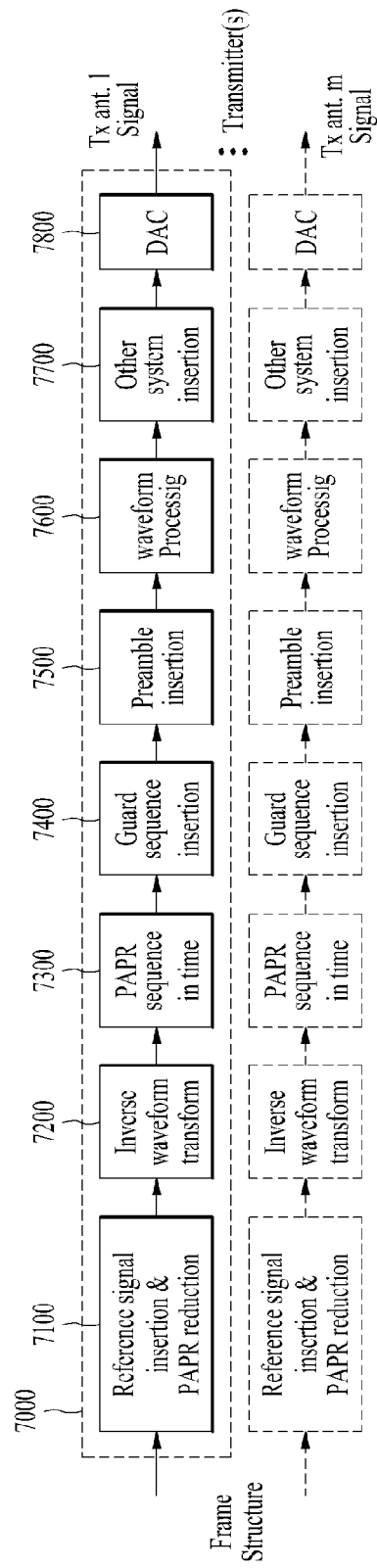
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
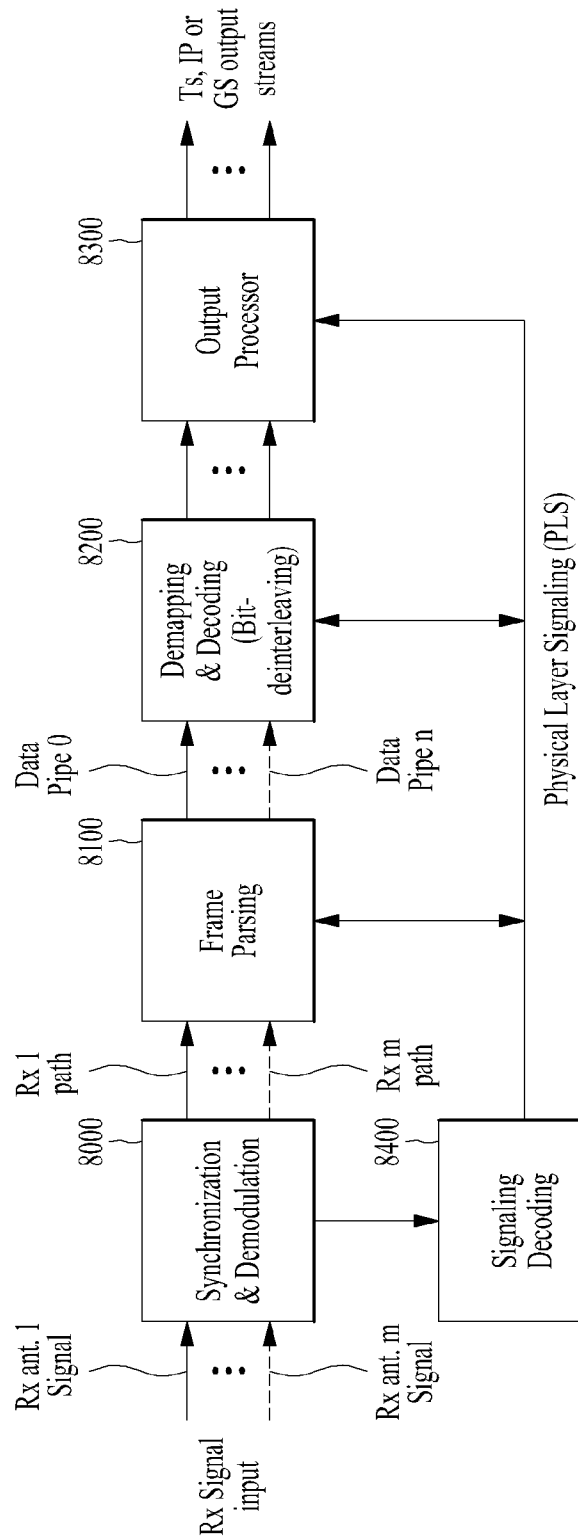
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
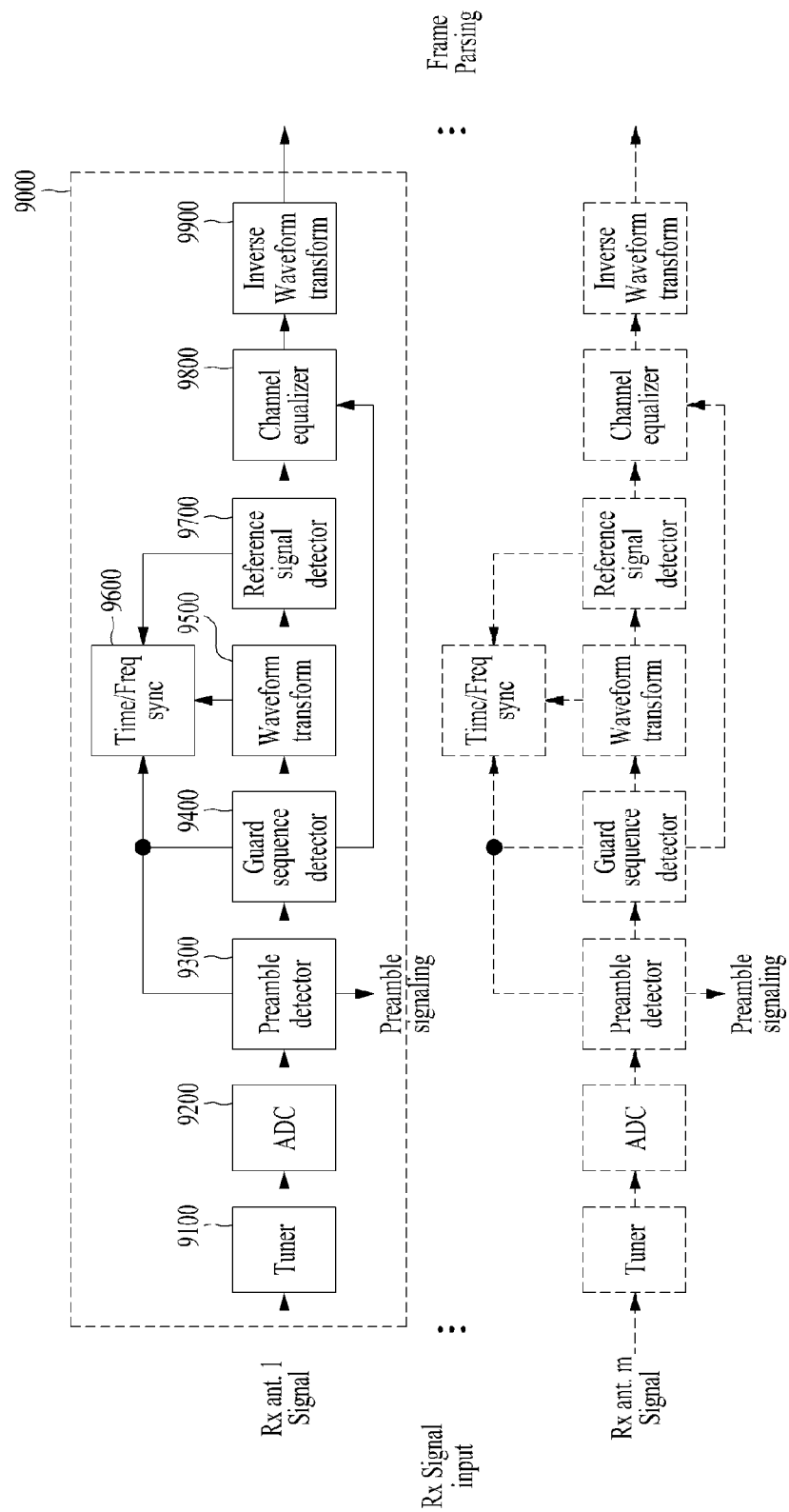
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
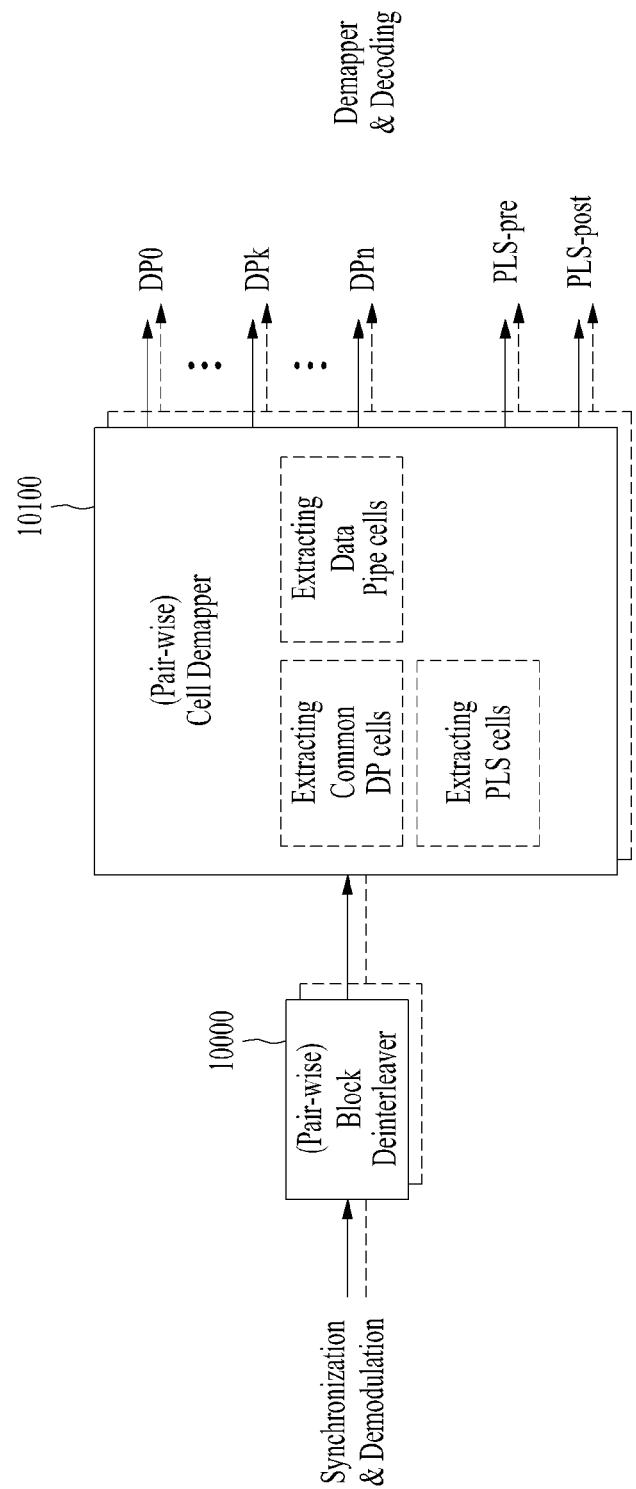
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block deinterleaver 10000 and at least one cell demapper 10100.

The block deinterleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block deinterleaver 10000 can process two consecutive pieces of data as a pair for each input path. Accordingly, the block interleaver 10000 can output two consecutive pieces of data even when deinterleaving has been performed. Furthermore, the block deinterleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
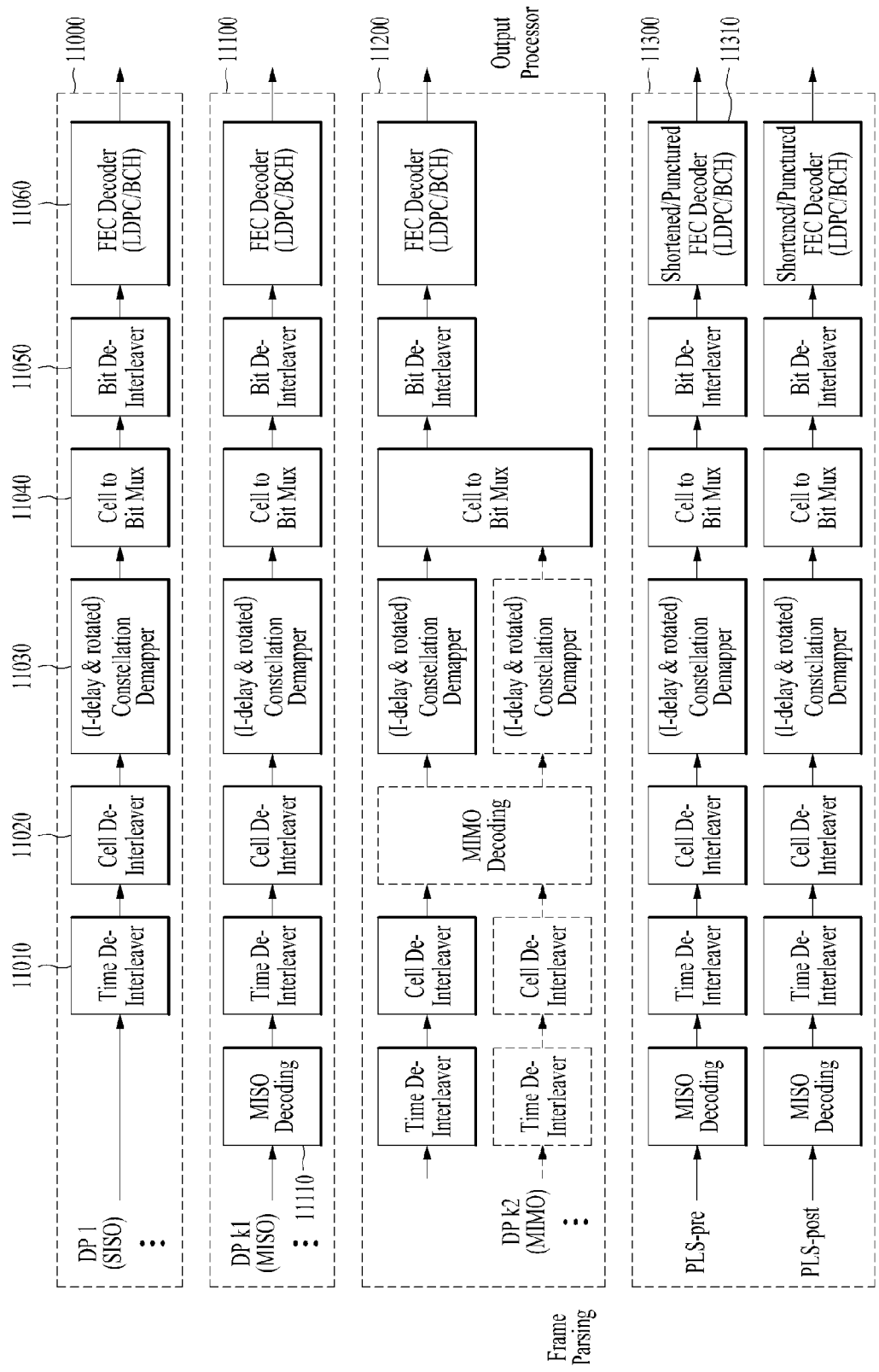
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
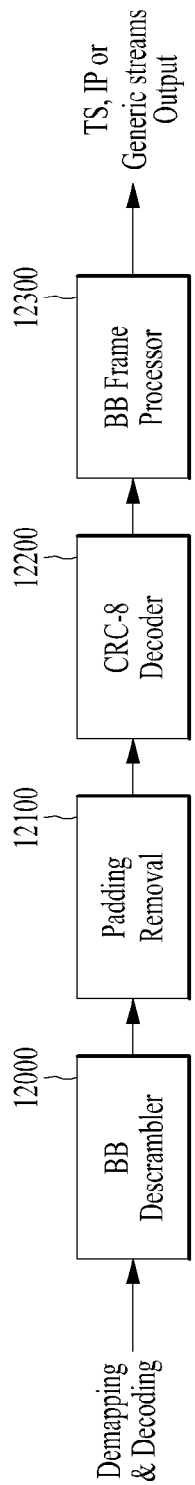
FIG. 12 illustrates an output processor according to an embodiment of the present invention.
Figure 13:
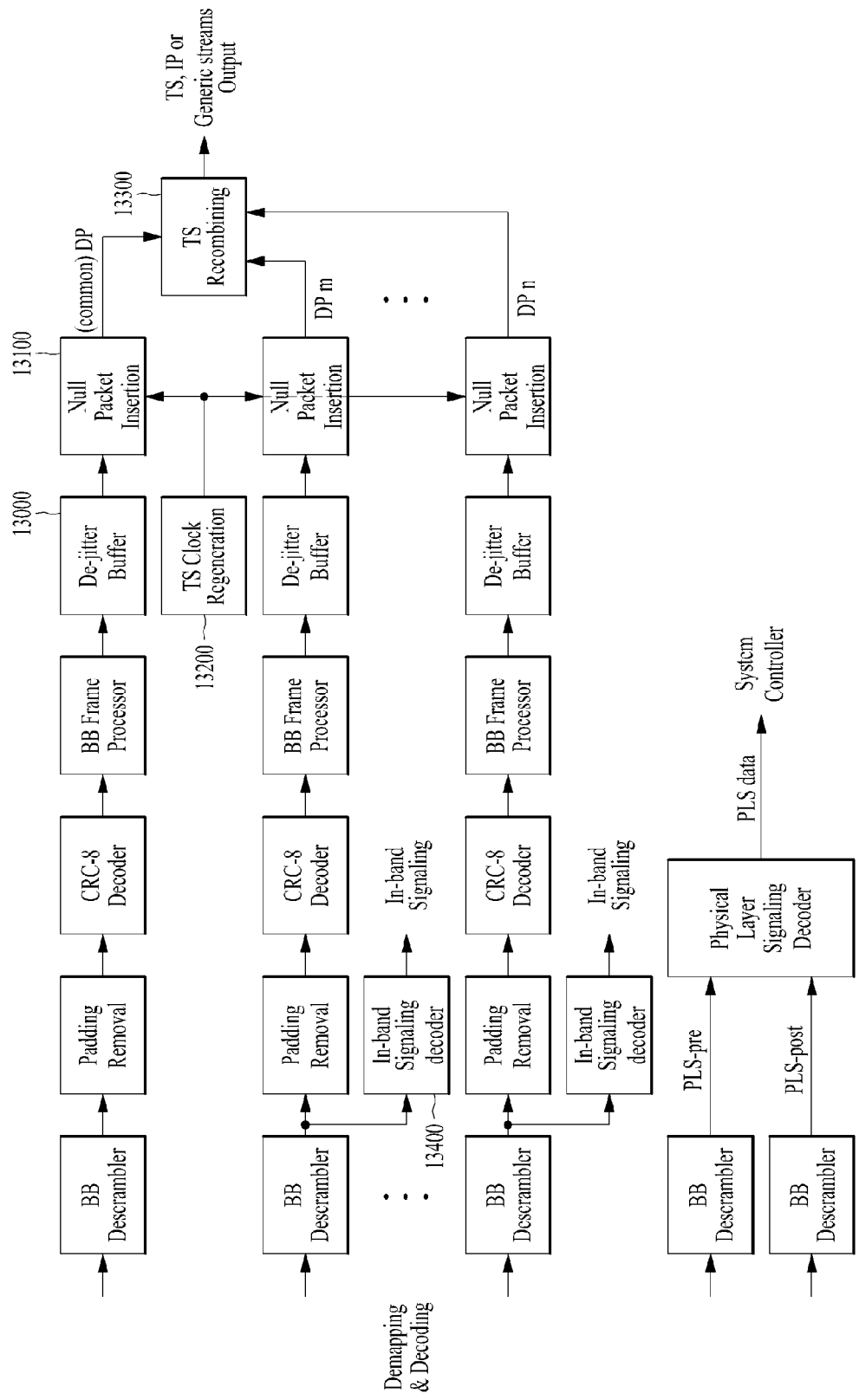
FIG. 13 illustrates an output processor according to another embodiment of the present invention.

FIGS. 12 and 13 illustrate output processors according to embodiments of the present invention.

FIG. 12 illustrates an output processor according to an embodiment of the present invention. The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention. The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
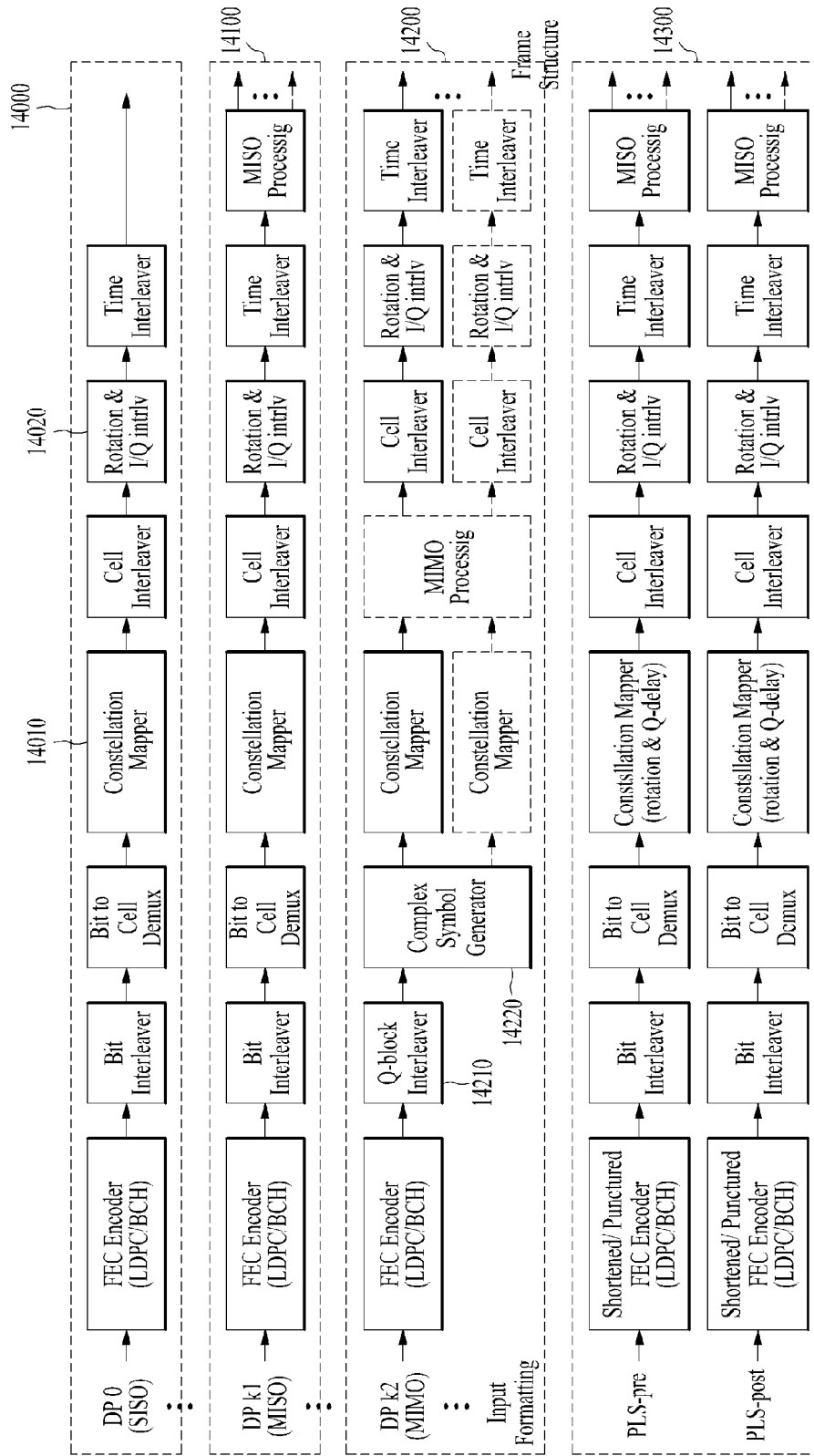
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
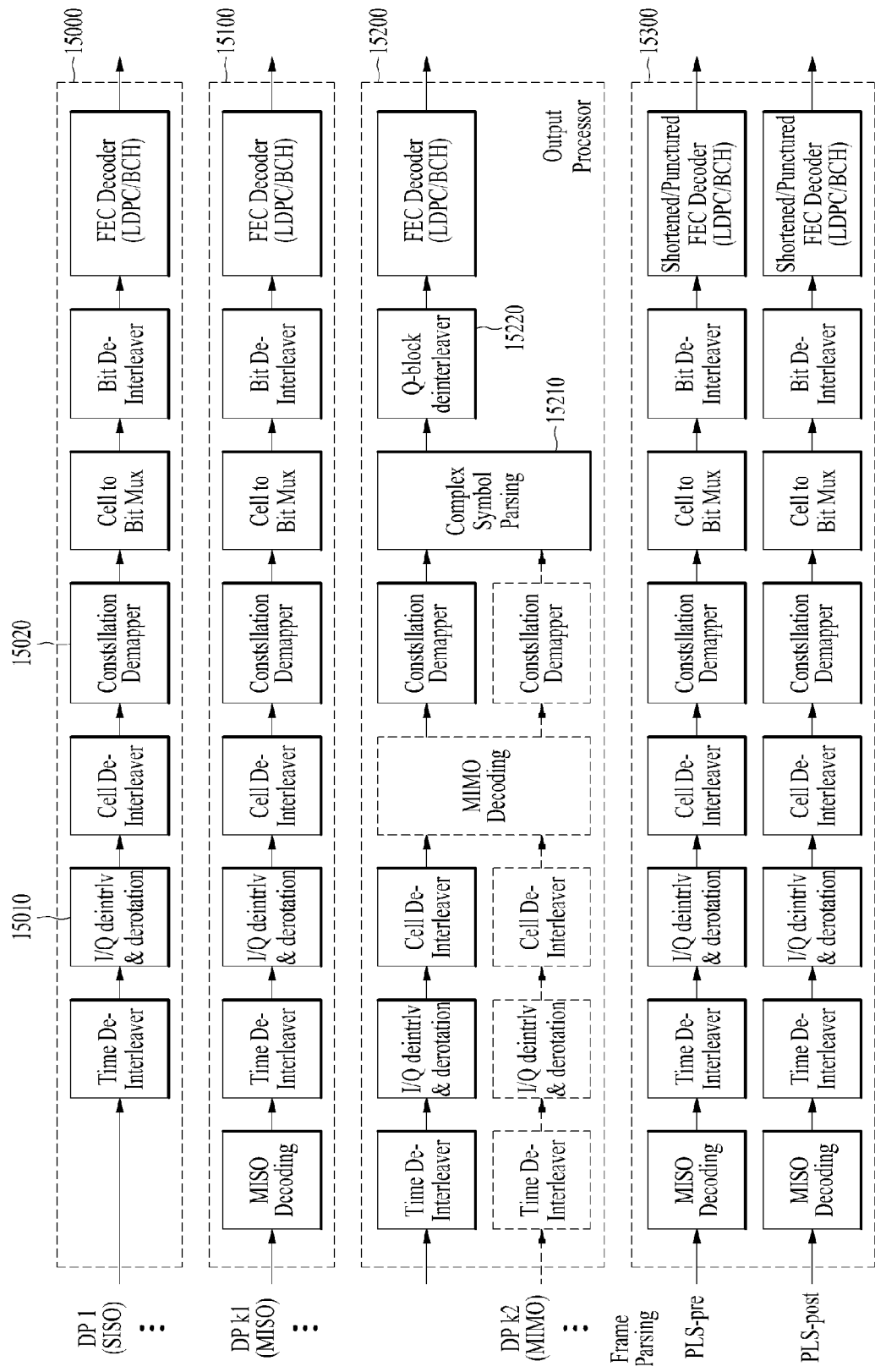
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

As described above, the waveform generation module 1300 according to an embodiment of the present invention may convert signal frames output from the frame structure module 1200 into ultimately transmittable signals. In this case, the waveform generation module 1300 according to an embodiment of the present invention may use a phase pre-distortion (PPD) method (or phase distortion). The phase pre-distortion method according to an embodiment of the present invention may be also referred to as a distributed MISO scheme or 2D-eSFN. In addition, the present invention assumes that input signals of the waveform generation block 1300 are the same.

The system according to the present invention supports the SFN (Single Frequency Network) network, where distributed MISO scheme is optionally used to support very robust transmission mode. The 2D-eSFN is a distributed MISO scheme that uses multiple TX antennas, each of which is located in the different transmitter site in the SFN network.

In the SFN configuration, the 2D-eSFN processing independently distorts the phase of the signals transmitted from multiple transmitters, in order to create both time and frequency diversity. Hence, burst errors due to low flat fading or deep-fading for a long time can be mitigated.

According to the phase pre-distortion method of the present invention, the performance of channel estimation by a broadcast signal reception apparatus may not deteriorate and gain distortion of a transmission signal may not be caused and thus the loss of transmission capacity due to the gain distortion may be minimized.

In addition, the phase pre-distortion method of the present invention may be applied independently to a plurality of TX antennas as described above and thus a diversity gain may be achieved. Further, since the broadcast signal reception apparatus does not need to process phase pre-distortion, additional complexity is not required to design the broadcast signal reception apparatus.

In a conventional broadcast signal transmission apparatus, when a TS stream is received as input data, the TS stream is split into packets (or data packets) on a service or service component basis for efficient transmission. In this procedure, packets other than the packets for a corresponding service or service component may be replaced with null packets.

According to the conventional technology, null packets are generated in the following cases.

1. In the case of a single TS stream, null packets can be inserted to adjust a variable data rate (VBR) of an image to a constant data rate (CBR).

2. In the case of a big TS stream, since a single TS steam has multiple broadcast services, null packets can be inserted after performing TS splitting. In detail, when an HD broadcast signal for fixed broadcasting and an SD broadcast signal for mobile broadcasting are transmitted using a single big TS stream, the TS stream is split based on the two services for efficient transmission. In this procedure, null packets are inserted to the position of the opposite packets for CBR.

3. For efficient transmission of a TS stream having a single service, the TS stream may be split into a video component stream and an audio component stream. As in 2 above, null packets can be inserted to the position of the opposite packets.

Since null packets are necessary for CBR as described above but do not have any information, a broadcast signal transmission apparatus may delete inserted null packets before transmission to increase transmission efficiency. In addition, the broadcast signal transmission apparatus may insert a deleted null packets (DNP) field indicating the number of deleted null packets into a front part of each TS packet such that a receiver can restore the deleted null packets. In this case, the DNP field has a size of 8 bits and a value thereof may be gradually increased by 1 based on the number of deleted null packets.

However, if a signal having a low data rate is input, if multiple services are split in a small unit, or if a large image signal such as UD is split as in a next-generation broadcast system, the number of inserted null packets may be increased.

That is, since a DNP value of 8 bits can indicate up to 255 null packets, DNP overflow can occur if the number of null packets exceeds 255. In this case, the problem of DNP overflow can be solved by inserting null packets therebetween. However, since null packets should be transmitted even when all null packets are deleted, transmission efficiency of a TS stream is reduced. In addition, if DNP is increased to solve the above-described problem, a larger DNP should be always transmitted and thus transmission efficiency is reduced.

Accordingly, to solve this problem, a DNP-offset method for transmitting information about the number of basically inserted null packets, i.e., a basic value, as DNP-offset using a BB frame.

That is, TS input streams or split TS streams having consecutive TS packets and deleted null packets may be mapped into a payload of BB frame. The BB frame includes a BB frame header and the payload.

DNP-offset is the minimum number of DNPs belonging to the same BBF. DNP-offset can be transmitted through the BB frame header. As such, the number of DNPs inserted in front of a TS packet may be reduced to implement efficient TS packet transmission, and a larger number of null packets may be deleted.

The present invention proposes a null packet spreading method capable of efficiently utilizing a DNP-offset method without reducing transmission efficiency. In the null packet spreading method according to the present invention, PCR may not be influenced even when the positions of null packets existing between program clock reference (PCR) packets are changed, transmission efficiency may be prevented from being reduced due to the number of null packets which exceeds the maximum value of a DNP field, and a DNP-offset method may be easily used. In addition, since a broadcast signal reception apparatus can periodically receive data, a buffer may be easily used in view of decoding of the broadcast signal reception apparatus.

Figure 16:
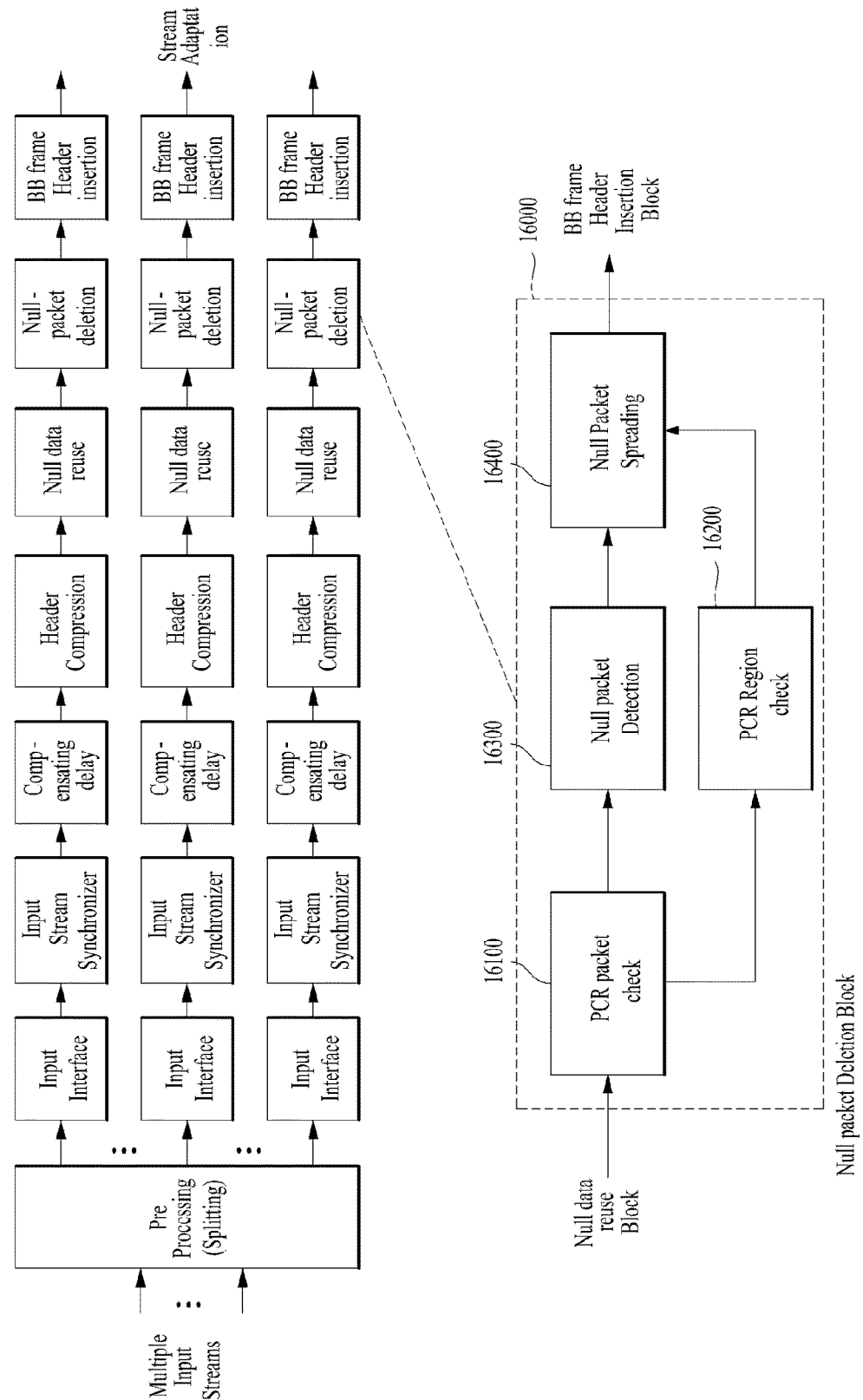
FIG. 16 is a view illustrating a null packet deletion block 16000 according to another embodiment of the present invention.

FIG. 16 is a view illustrating a null packet deletion block 16000 according to another embodiment of the present invention.

An upper part of FIG. 16 is a view illustrating another embodiment of the mode adaptation module of the input formatting module described above in relation to FIG. 3, and a lower part of FIG. 16 is a view illustrating specific blocks of the null packet deletion block 16000 included in the mode adaptation module.

As described above, the mode adaptation module of the input formatting module for processing multiple input streams may independently process the input streams.

As illustrated in FIG. 16, the mode adaptation module for processing each of the multiple input streams may include a pre-processing block (splitter), input interface blocks, input stream synchronizer blocks, compensating delay blocks, header compression blocks, null data reuse blocks, null packet deletion blocks, and BB frame header insertion blocks. Operations of the input interface blocks, the input stream synchronizer blocks, the compensating delay blocks and the BB frame header insertion blocks are the same as those described above in relation to FIG. 3 and thus detailed description s thereof are omitted here.

The pre-processing block may split the input TS, IP, GS streams into multiple service or service component (audio, video, etc.) streams. In addition, the header compression block may compress a header of an input signal based on a header compression mode. The null packet deletion block 16000 according to an embodiment of the present invention may delete input null packets and insert information about the number of deleted null packets based on positions thereof, before transmission. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted DNP field that is inserted in the transmission, thus guaranteeing constant bit-rate and avoiding the need for timestamp (PCR) updating.

As illustrated in the lower part of FIG. 16, the null packet deletion block 16000 according to an embodiment of the present invention may include a PCR packet check block 16100, a PCR region check block 16200, a null packet detection block 16300 and a null packet spreading block 16400. A description is now given of operation of each block.

The PCR packet check block 16100 may determine whether input TS packets include a PCR for synchronizing a decoding timing. In the present invention, a TS packet including a PCR may be called a PCR packet.

If the position of a PCR is detected as a result of determination, the PCR packet check block 16100 may change the positions of null packets without changing the position of the PCR.

The PCR region check block 16200 may check a TS packet including a PCR packet and determine whether null packets exist within a range of the same cycle (i.e., PCR region). In the present invention, a period for determining whether a PCR is included may be called a null packet position reconfigurable region.

The null packet detection block 16300 may check null packets included between input TS packets.

The null packet spreading block 16400 may spread null packets within PCR region information output from the PCR region check block 16200.

The present invention proposes a method for collecting null packets and a method for distributing null packets as examples of a method for changing the positions of null packets.

Figure 17:
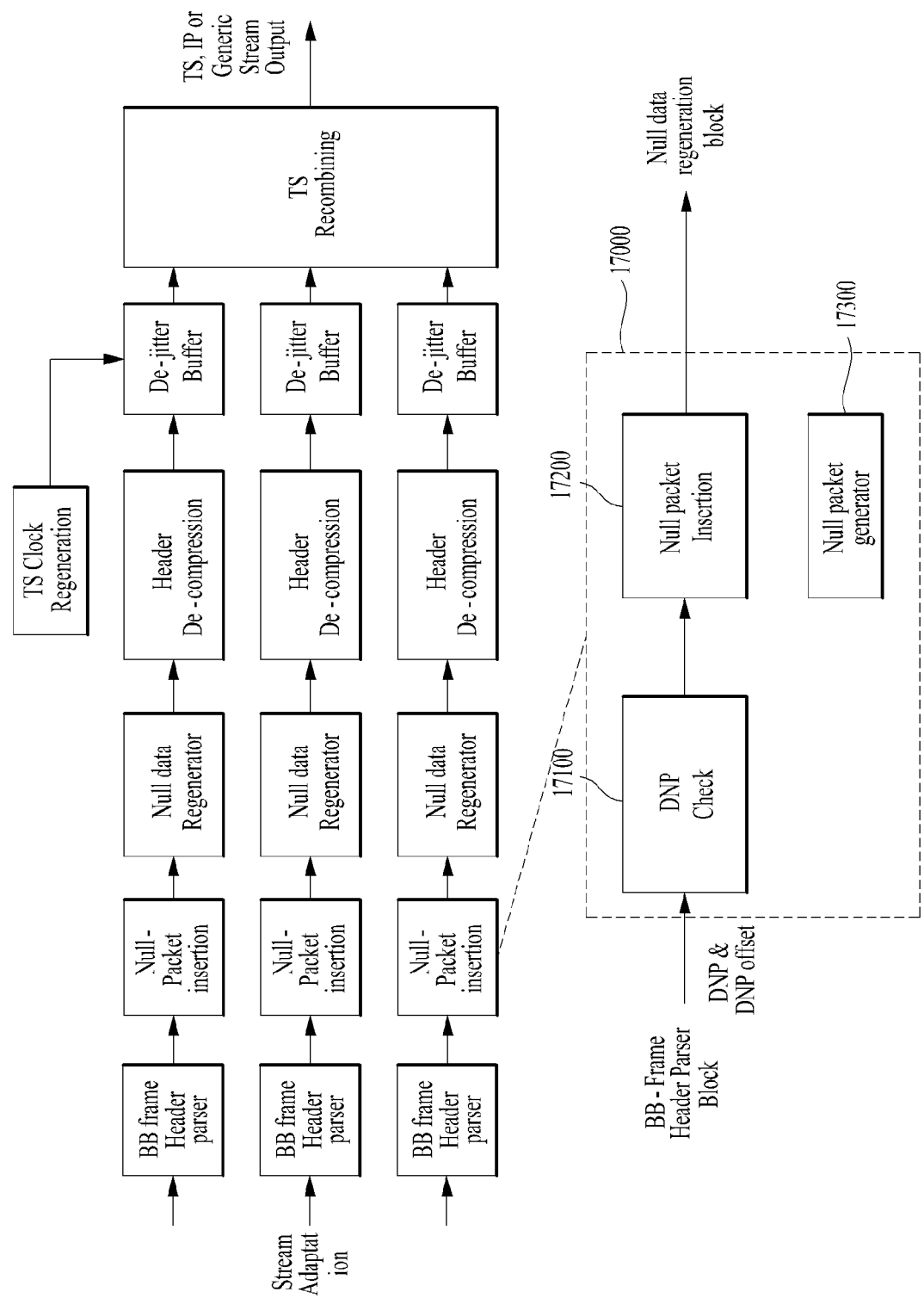
FIG. 17 is a view illustrating a null packet insertion block 17000 according to another embodiment of the present invention.

FIG. 17 is a view illustrating a null packet insertion block 17000 according to another embodiment of the present invention.

An upper part of FIG. 17 is a view illustrating another embodiment of the output processor described above in relation to FIG. 13, and a lower part of FIG. 17 is a view illustrating specific blocks of the null packet insertion block 17000 included in the output processor.

The output processor illustrated in FIG. 17 may perform a reverse procedure of the operation performed by the mode adaptation module described above in relation to FIG. 16.

As illustrated in FIG. 17, the output processor according to an embodiment of the present invention may include BB frame header parser blocks, null packet insertion blocks, null data regenerator blocks, header de-compression blocks, de-jitter buffer blocks, a TS clock regeneration block and a TS recombining block. Operations of the blocks correspond to reverse procedures of those of the blocks of FIG. 16 and thus detailed descriptions thereof are omitted here.

The null packet insertion block 17000 illustrated in the lower part of FIG. 17 may perform a reverse procedure of the above-described operation performed by the null packet deletion block 16000 of FIG. 16.

As illustrated in FIG. 17, the null packet insertion block 17000 may include a DNP check block 17100, a null packet insertion block 17200 and a null packet generator block 17300.

The DNP check block 17100 may check DNP and acquire information about the number of deleted null packets. The null packet insertion block 17200 may receive the information about the number of deleted null packets output from the DNP check block 17100 and insert the deleted null packets. In this case, the null packets to be inserted may be previously generated by the null packet generator block 17300.

Figure 18:
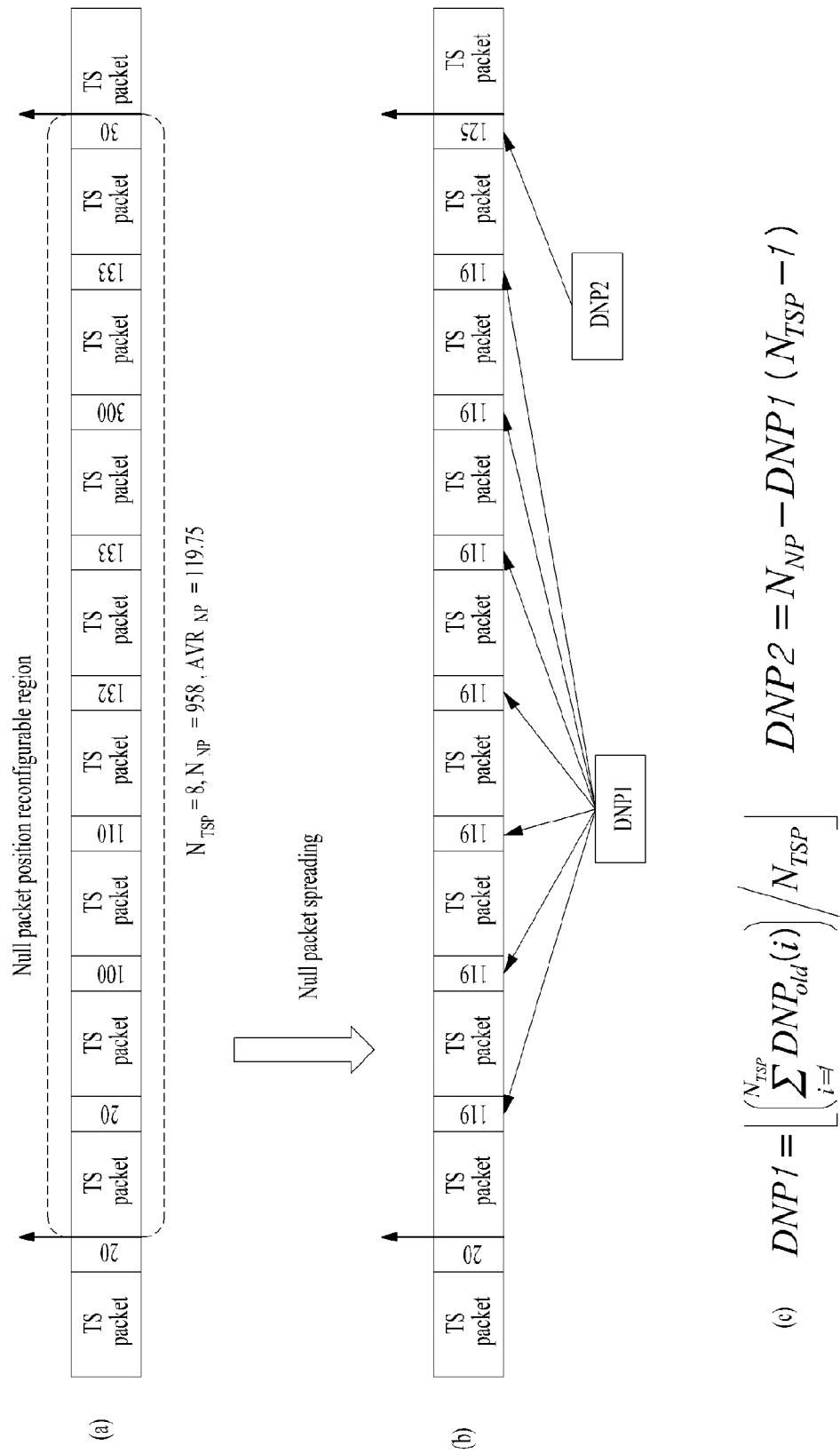
FIG. 18 is a view illustrating a null packet spreading method according to an embodiment of the present invention.

FIG. 18 is a view illustrating a null packet spreading method according to an embodiment of the present invention.

FIG. 18(a) illustrates TS packets before the null packet spreading method is used, and FIG. 18(b) illustrates TS packets after the null packet spreading method is used.

FIG. 18(c) illustrates Math Figures which express DNP1 and DNP2 based on the null packet spreading method.

As illustrated in FIG. 18(a), the null packet deletion block 16000 according to an embodiment of the present invention may determine whether input TS packets include a PCR for synchronizing a decoding timing. That is, if null packet position reconfigurable region information is acquired, a broadcast signal transmission apparatus according to an embodiment of the present invention may count a total number of null packets ($N_{NP}$) included in a corresponding period and a total number of data packets ($N_{TSP}$) to be transmitted. As illustrated in FIG. 18(a), the total number of data packets is 8 and the total number of null packets corresponds to 958. AVRnP refers to an average number of null packets spreadable between the data packets within the corresponding period. As illustrated in FIG. 18(a), AVRnP of the corresponding period is 119.75.

After that, the null packet deletion block 16000 according to an embodiment of the present invention may spread null packets within output PCR region information. That is, if null packets are deleted, DNP indicating the number of null packets is inserted to a position from which the null packets are deleted. The broadcast signal transmission apparatus according to an embodiment of the present invention may perform null packet spreading by calculating DNP1 and DNP2. FIG. 18(b) illustrates null packets spread based on DNP1 and DNP2. DNP1 may be calculated using DNP values inserted to correspond to 1 to NTSP-1 TS packets and the total number of data packets ($N_{TSP}$) to be transmitted, based on the Math Figure illustrated in FIG. 18(c). DNP1 may have an integer value of the above-described average number of null packets.

In addition, DNP2 may be calculated as a remainder not processed by DNP1, based on the Math Figure illustrated in FIG. 18(c). DNP2 may have a value greater than or equal to the value of DNP1 and may be inserted before the last TS packet or at the end of the null packet position reconfigurable region.

The null packet spreading method illustrated in FIG. 18 may be more effective to solve the above-described problem in a case when the maximum DNP value for null packets generated due to TS packet splitting exceeds 300.

Figure 19:
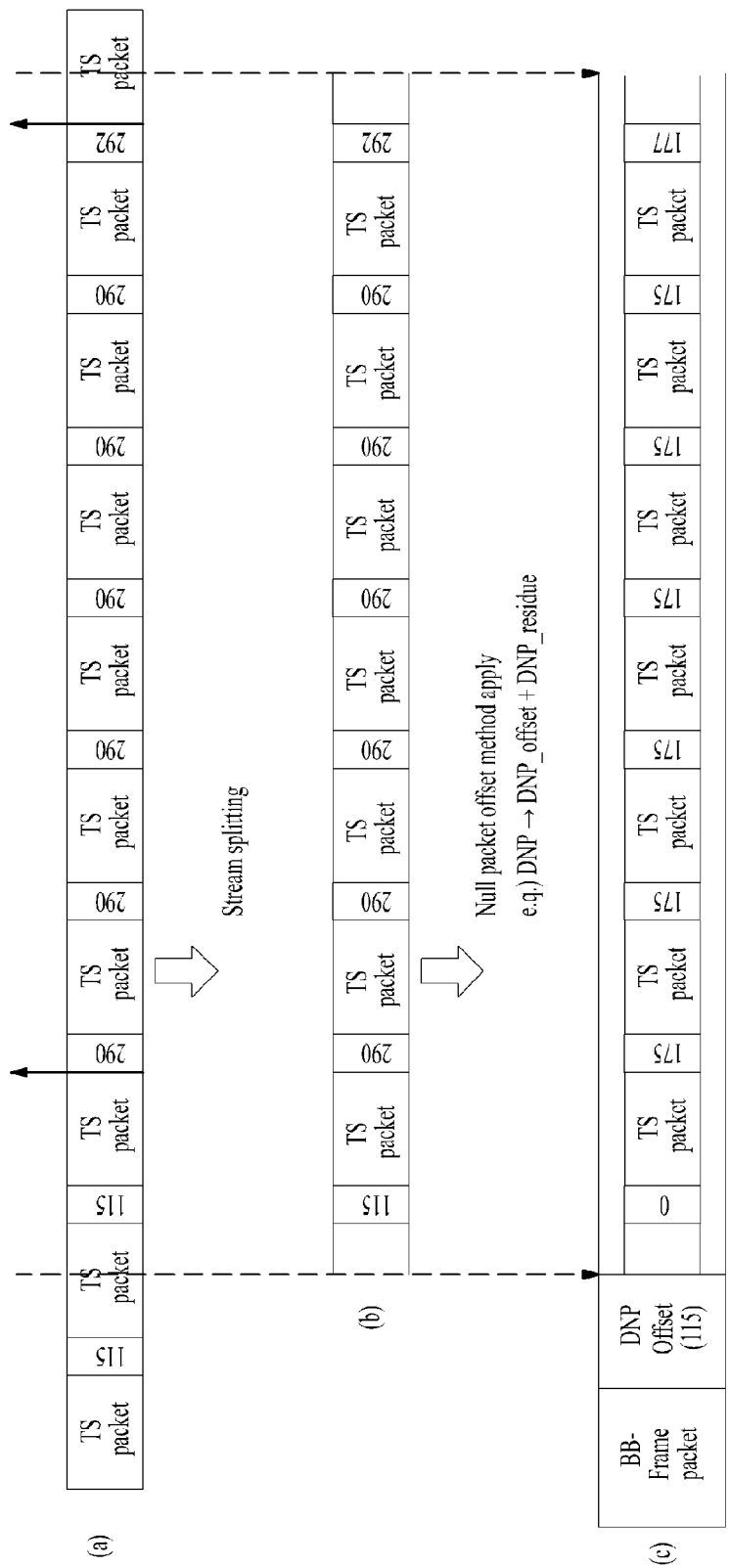
FIG. 19 is a view illustrating a null packet offset method according to an embodiment of the present invention.

FIG. 19 is a view illustrating a null packet offset method according to an embodiment of the present invention.

If the number of null packets is excessively large, the number can exceed the maximum DNP value even when the null packet spreading method described above in relation to FIG. 18 is used.

That is, when an input TS stream is split as illustrated in FIG. 19(a), multiple null packets may be generated. Specifically, in a case when multiple TS streams are combined into a big TS stream, when a single TS stream is split based on component levels, or when and a big TS stream is split into video packets and audio packets as in UD service, null packets may be periodically inserted. TS input streams or split TS streams having consecutive TS packets and deleted null packets may be mapped into a payload of BB frame. The BB frame includes a BB frame header and the payload.

In this case, as described above, if the number of null packets is large as illustrated in FIG. 19(b), the value of DNP can be equal to or greater than 290 in some cases.

Accordingly, as illustrated in FIG. 19(c), the null packet deletion block 16000 according to an embodiment of the present invention may determine TS packets to be inserted into the payload of the BB frame and determine the most basic DNP value as DNP-offset.

According to an embodiment of the present invention, DNP-offset is the minimum number of DNPs belonging to the same BBF. DNP-offset can be transmitted through the BB frame header. As such, the number of DNPs inserted in front of a TS packet may be reduced to implement efficient TS packet transmission, and a larger number of null packets may be deleted.

Accordingly, as illustrated in FIG. 19(c), the value of DNP-offset is 115, and the first DNP has a value of 0 while the second DNP has a value of 175 obtained by subtracting 115 from an original value 290. The same principle can also be applied sequentially to the other DNPs.

Figure 20:
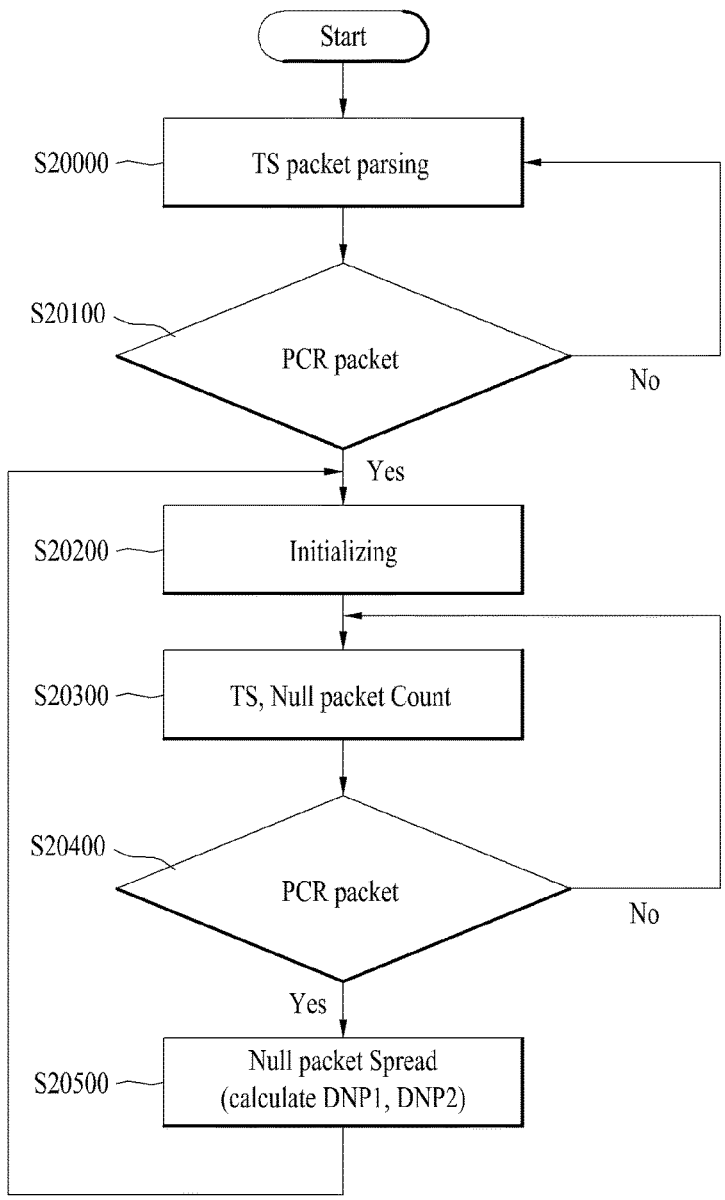
FIG. 20 is a flowchart illustrating a null packet spreading method according to an embodiment of the present invention.

FIG. 20 is a flowchart illustrating a null packet spreading method according to an embodiment of the present invention.

The null packet deletion block 16000 according to an embodiment of the present invention may parse input TS packets for analysis (S20000). In this case, the null packet deletion block 16000 according to an embodiment of the present invention may parse the TS packets in units of the above-described null packet position reconfigurable region.

After that, the null packet deletion block 16000 according to an embodiment of the present invention may determine whether PCR information exists in a corresponding null packet position reconfigurable region (S20100). In this case, the null packet deletion block 16000 according to an embodiment of the present invention may determine the presence of PCR information by checking a PCR flag of an adaptation field in a header of an input TS packet.

If a PCR value exists as a result of determination, the null packet deletion block 16000 according to an embodiment of the present invention may initialize a counter and related values for null packet spreading (S20200), and count the number of input data TS packets and the number of null packets (S20300). After that, the null packet deletion block 16000 according to an embodiment of the present invention may determine whether a PCR packet exists (S20400). If a PCR value is not present as a result of determination, the null packet deletion block 16000 according to an embodiment of the present invention may continue to count the number of null packets and the number of data TS packets (S20300).

If a PCR value exists as a result of determination, the null packet deletion block 16000 according to an embodiment of the present invention may perform null packet spreading (S20500). In this case, the null packet deletion block 16000 according to an embodiment of the present invention may calculate the above-described DNP1 and DNP2 values, and may use the above-described null packet offset method if a corresponding value exceeds the maximum DNP value.

Figure 21:
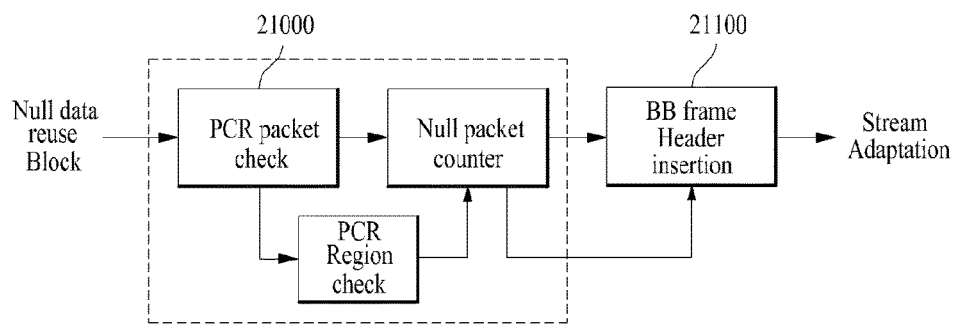
FIG. 21 is a view illustrating a null packet deletion block 21000 according to another embodiment of the present invention.

FIG. 21 is a view illustrating a null packet deletion block 21000 according to another embodiment of the present invention.

In detail, FIG. 21 is a view illustrating specific blocks of the null packet deletion block 21000 included in a mode adaptation module.

The null packet deletion block 21000 illustrated in FIG. 21 is similar to the null packet deletion block 16000 described above in relation to FIG. 16, but is different therefrom in that only a PCR packet check block, a PCR region check block and a null packet counter block are included while a null packet spreading block is not.

The PCR packet check block may determine whether input TS packets include a PCR, and change the positions of the TS packets without changing the position of the PCR. The PCR region check block may check a TS packet including a PCR packet, determine whether null packets exist within a range of the same cycle (i.e., PCR region), and transmit a PCR cycle to the null packet counter block. Then, the null packet counter block may count the number of data TS packets and the number of null packets in the input TS packets.

After that, the null packet counter block may transmit information about the number of data TS packets and information about the number of null packets to a BB frame header insertion block 21100. In the present invention, the information about the number of data TS packets may be denoted by NUM_TSP, and the information about the number of null packets may be denoted by NUM_NP. This is variable according to the intention of a designer.

The BB frame header insertion block 21100 may generate a BB frame header including the received information about the number of data TS packets and the information about the number of null packets.

Figure 22:
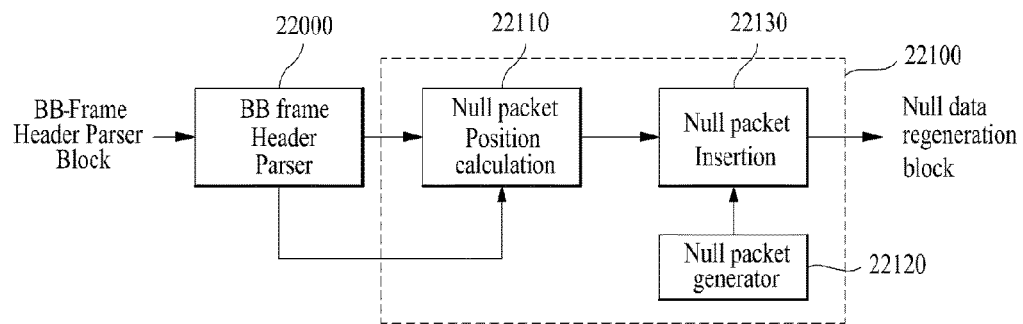
FIG. 22 is a view illustrating a null packet insertion block 22100 according to another embodiment of the present invention.

FIG. 22 is a view illustrating a null packet insertion block 22100 according to another embodiment of the present invention.

In detail, FIG. 22 is a view illustrating specific blocks of the null packet insertion block 22100 included in an output processor. The null packet insertion block 22100 illustrated in FIG. 22 is another embodiment of the null packet insertion block 17000 described above in relation to FIG. 17, and may include a null packet position calculation block 22110, a null packet generator block 22120 and a null packet insertion block 22130. A description is now given of operation of each block.

A BB frame header parser block 22000 may parse a header of an input BB frame. The BB frame header may include information about the positions and the number of null packets. The information about the positions and the number of null packets may include information about the number of PCRs, PCR start information, information about the number of data TS packets and information about the number of null packets.

In the present invention, the information about the number of PCRs may be denoted by NUM_PCR and the PCR start information may be denoted by START_PCR. The information about the number of data TS packets and the information about the number of null packets may be denoted as described above. This is variable according to the intention of a designer.

After that, the null packet position calculation block 22110 may determine the positions and the number of null packets using the information received from the BB frame header parser block 22000. In this case, null packets may be spread based on the above-described null packet spreading method, and the number of null packets in a PCR cycle is the same as the number of originally existing null packets.

The null packet generator block 22120 may generate null packets based on the determined positions and the number of null packets, and the null packet insertion block 22130 may insert the generated null packets using the information output from the null packet position calculation block 22110.

Figure 23:
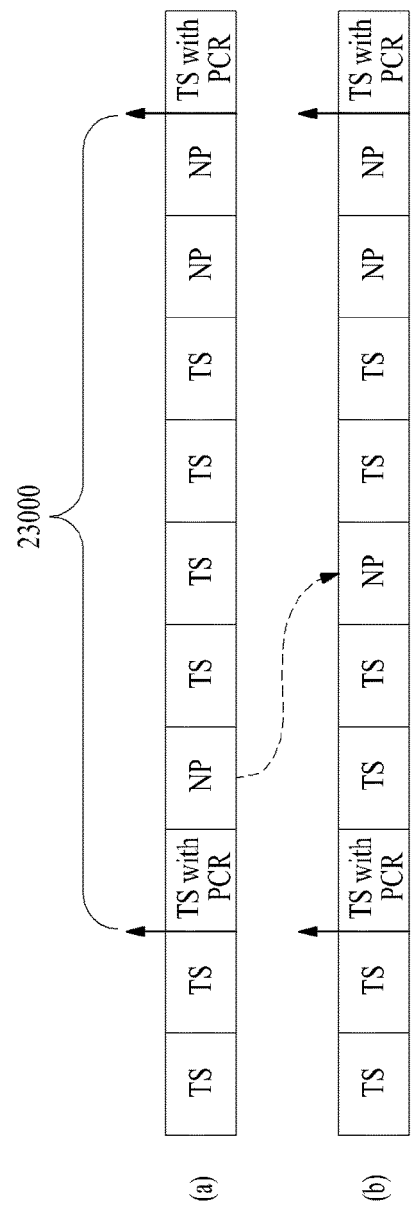
FIG. 23 is a view illustrating a PCR cycle and the positions of null packets according to an embodiment of the present invention.

FIG. 23 is a view illustrating a PCR cycle and the positions of null packets according to an embodiment of the present invention.

A program clock reference (PCR) refers to a timing reference value included and transmitted in a TS packet to allow a broadcast signal reception apparatus to synchronize timing with a broadcast signal transmission apparatus. Accordingly, the broadcast signal reception apparatus may set or synchronize the value of a system time clock (STC) using the PCR. That is, the PCR may be used as a reference time for a channel. In the present invention, a TS packet including a PCR may be called a PCR packet. The PCR has a size of 42 bits and can be divided into a PCR base having a size of 33 bits and a PCR extension (PCR ext) having a size of 9 bits. The PCR base may be inserted in a cycle of 90 khz and the PCR ext may be inserted in a cycle of 27 Khz.

In addition, PCR flag information included in an additional field of a TS packet header may indicate whether a PCR is included in the corresponding TS packet.

Math Figure 1 shows a PCR base, a PCR ext and a PCR.

MathFigure 1

$$PCR\_base(i) = ((system\_clock\_frequency * t(i))/300)2^{33}$$

$$PCR\_ext(i) = ((system\_clock\_frequency * t(i))/1)300$$

$$PCR(i) = PCR\_base(i) * 300 + PCR\_ext(i) \quad \text{[Math.1]}$$

FIG. 23(a) is a view illustrating data packets and null packets included in a PCR cycle 23000 of a TS stream, and FIG. 23(b) is a view illustrating data packets and null packets in a case when the position of a null packet is changed within the same cycle of the TS stream. As illustrated in FIG. 23, a PCR is not influenced even when the position of a null packet is changed within the corresponding cycle.

Figure 24:
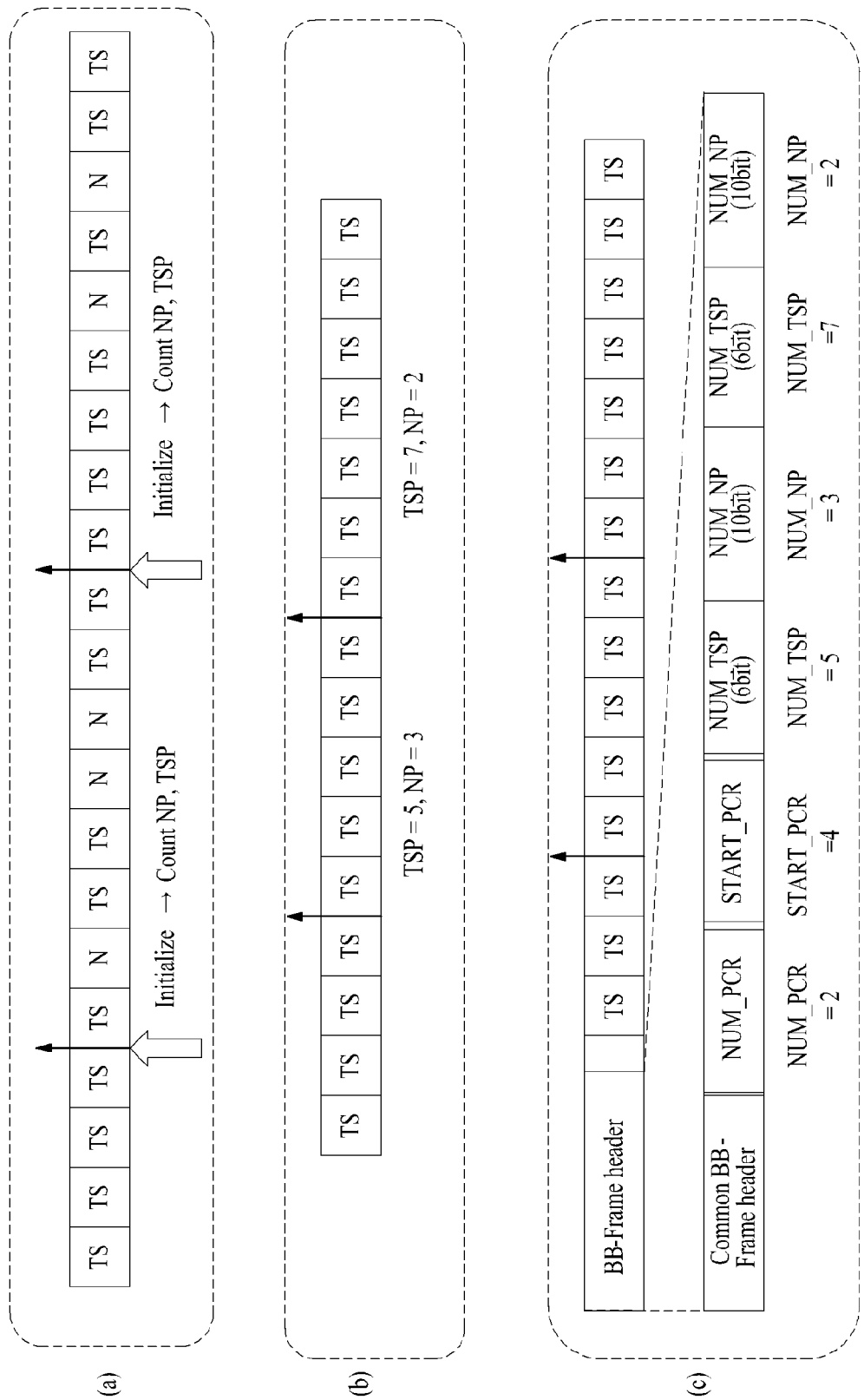
FIG. 24 illustrates operation of a broadcast signal transmission apparatus according to an embodiment of the present invention.

FIG. 24 illustrates operation of a broadcast signal transmission apparatus according to an embodiment of the present invention.

In detail, FIG. 24 illustrates operation of the broadcast signal transmission apparatus related to null packet deletion. As described above, the broadcast signal transmission apparatus (or the null packet deletion block 21000) according to an embodiment of the present invention may increase the efficiency of null packet deletion by checking a PCR cycle, determining a PCR period, and gathering null packets between two PCR packets, i.e., null packets located in the PCR period. The operation of the broadcast signal transmission apparatus according to an embodiment of the present invention may include a first step for checking PCR packets and counting TS packets and null packets, a second step for performing null packet deletion, and a third step for performing stream splitting and BB frame inserting.

FIG. 24(a) illustrates the first step, FIG. 24(b) illustrates the second step, and FIG. 24(c) illustrates the third step. A description is now given of each step.

FIG. 24(a) illustrates a procedure for checking PCR packets and counting the number of TS packets and the number of null packets when the broadcast signal transmission apparatus according to an embodiment of the present invention receives consecutive TS streams.

In detail, the broadcast signal transmission apparatus according to an embodiment of the present invention may receive consecutive TS streams and parse a header of a TS packet to determine whether the TS packet includes a PCR.

Information indicating whether a PCR is included in a TS packet, e.g., PCR_Flag, is included in an adaptation field of a TS packet header. Accordingly, the null packet deletion block 21000 according to an embodiment of the present invention may check PCR_Flag included in the adaptation field.

If a PCR packet is detected, the broadcast signal transmission apparatus according to an embodiment of the present invention may initialize a data TS packet counter, a null packet counter and the system in every PCR period, and check subsequently input TS packets to count the number of data TS packets and the number of null packets. Each arrow illustrated in FIG. 24 indicates a PCR period where initialization starts.

FIG. 24(b) illustrates a procedure for null packet deletion performed by the null packet deletion block 21000 according to an embodiment of the present invention.

In detail, the broadcast signal transmission apparatus according to an embodiment of the present invention may save the above-described information about the number of data TS packets (NUM_TSP) and the information about the number of null packets (NUM_NP), and delete null packets.

As illustrated in FIG. 24(b), the number of data TS packets is 5 and the number of null packets is 3 in the first period, and the number of data TS packets is 7 and the number of null packets is 2 in the second period.

FIG. 24(c) illustrates a generated BB frame and a BB frame header. As illustrated in FIG. 24(c), the BB frame may include a header and a payload.

The BB frame header may include a common BB frame header and the above-described information about the positions and the number of null packets. Multiple data TS packets may be included in the payload.

The information about the positions and the number of null packets included in the BB frame header may be located subsequently to the common BB frame header. A description is now given of the information about the positions and the number of null packets.

NUM_PCR may be located subsequently to the common BB frame header. Since the number of detected PCRs is two as illustrated in FIGS. 24(a) and 24(b), the value of NUM_PCR is 2. START_PCR may be located subsequently to NUM_PCR. Since the first PCR is detected at the fourth TS packet, the value of START_PCR is 4.

Information about the number of data TS packets and the number of null packets within the first PCR period may be located subsequently to START_PCR. Since the number of data TS packets is 5 and the number of null packets is 3 in the first period as described above, the value of NUM_TSP may be 5 and the value of NUM_NP may be 3. In this case, NUM_TSP may have a size of 6 bits and NUM_NP may have a size o 10 bits.

Information about the number of data TS packets and the number of null packets within the second PCR period may be located subsequently to the information about the number of data TS packets and the number of null packets within the first PCR period. Since the number of data TS packets is 7 and the number of null packets is 2 in the second period as described above, the value of NUM_TSP may be 7 and the value of NUM_NP may be 2. In this case, the sizes of NUM_TSP and NUM_NP are the same as those of the first PCR period.

The BB frame header may include information about the positions and the number of null packets. The information about the positions and the number of null packets may include information about the number of PCRs, PCR start information, information about the number of data TS packets and information about the number of null packets.

In the present invention, the information about the number of PCRs may be denoted by NUM_PCR and the PCR start information may be denoted by START_PCR.

Figure 25:
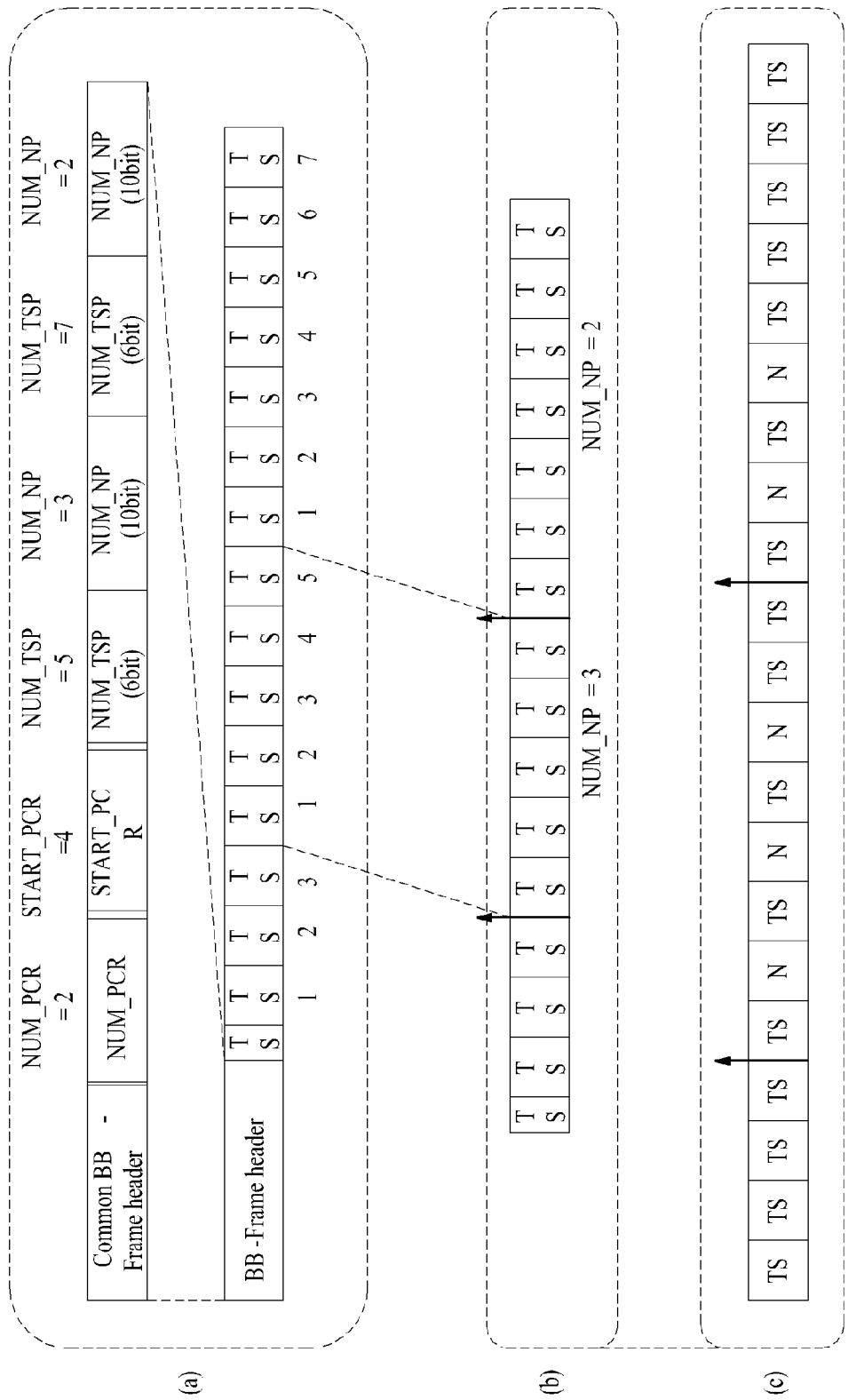
FIG. 25 illustrates operation of a broadcast signal reception apparatus according to an embodiment of the present invention.

FIG. 25 illustrates operation of a broadcast signal reception apparatus according to an embodiment of the present invention.

The operation illustrated in FIG. 25 corresponds to a reverse procedure of the operation of the broadcast signal transmission apparatus described above in relation to FIG. 24. The operation of the broadcast signal reception apparatus according to an embodiment of the present invention may include a first step for parsing a BB frame header, a second step for checking PCR packets, and a third step for performing null packets generation and spreading.

FIG. 25(a) illustrates the first step, FIG. 25(b) illustrates the second step, and FIG. 25(c) illustrates the third step. A description is now given of each step.

FIG. 25(a) illustrates a procedure for receiving a BB frame and parsing a BB frame header by the broadcast signal reception apparatus according to an embodiment of the present invention.

As described above, the BB frame header may include a common BB frame header and information about the positions and the number of null packets. The information about the positions and the number of null packets is as described above in relation to FIG. 24 and thus a detailed description thereof is omitted here.

Accordingly, the broadcast signal reception apparatus may acquire information about the number of PCRs (or PCR packets) in the corresponding BB frame (NUM_PCR), the value of START_PCR, and information about the number of null packets (NUM_NP) and the number of data TS packets (NUM_TSP) in each PCR period.

FIG. 25(b) illustrates a procedure for checking the positions of PCR packets using the acquired NUM_PCR, START_PCR and NUM_TSP by the broadcast signal reception apparatus according to an embodiment of the present invention.

FIG. 25(c) illustrates a procedure for inserting null packets by the broadcast signal reception apparatus according to an embodiment of the present invention.

In this case, the broadcast signal reception apparatus according to an embodiment of the present invention spreads null packets to each PCR period using the information about the number of data TS packets and the number of null packets included the corresponding PCR period, and distributes a remainder sequentially from the first TS packet. After that, the null packets may be inserted.

FIG. 26 is a view illustrating syntax of a BB frame header according to an embodiment of the present invention.

The syntax of the BB frame header according to an embodiment of the present invention may largely include syntax including a conventional BB frame header field and syntax extension including fields corresponding to information about null packets.

Accordingly, a common (or conventional) BB frame header field illustrated in FIG. 26 corresponds to the syntax including the conventional BB frame header. In addition, the other fields, e.g., NUM_PCR, START_PCR and for loop, correspond to the syntax extension. The for loop included in the syntax extension may include NUM_TSP and NUM_NP for each PCR period.

A description is now given of each field.

The common (or conventional) BB frame header field has a size of N bits and may include conventional BB frame header information. The size of the common (or conventional) BB frame header field is variable according to the intention of a designer.

NUM_PCR has a size of 4 bits and may indicate the number of PCR packets included in a BB frame. That is, NUM_PCR may indicate the number of PCR periods included in the corresponding BB frame. The number of PCR packets according to an embodiment of the present invention may be up to 16. According to an embodiment of the present invention, considering that a TS stream is split, a part including a SYNC byte (0x47) may be regarded as a start of a PCR packet. According to another embodiment of the present invention, when packets are deleted for efficiency, a part including the first byte of a TS packet may be regarded as a start of a PCR packet.

START_PCR has a size of 6 bits and may indicate the position of a TS packet including the first PCR. That is, if START_PCR is 3, this means that the third TS packet includes a PCR. A unit thereof is a TS packet (188 bytes).

The for loop is repeated a number of times corresponding to the number of PCRs. That is, NUM_TSP and NUM_NP may be indicated for each PCR period.

NUM_TSP has a size of 6 bits and indicates the number of TS packets (or data TS packets) to be actually transmitted. Accordingly, up to 64 TS packets may be signaled.

NUM_NP has a size of 10 bits and may indicate the number of null packets which exist in a PCR period (or cycle). That is, up to 1024 null packets may be indicated.

The size, position, etc. of each field are variable according to the intention of a designer.

Figure 27:
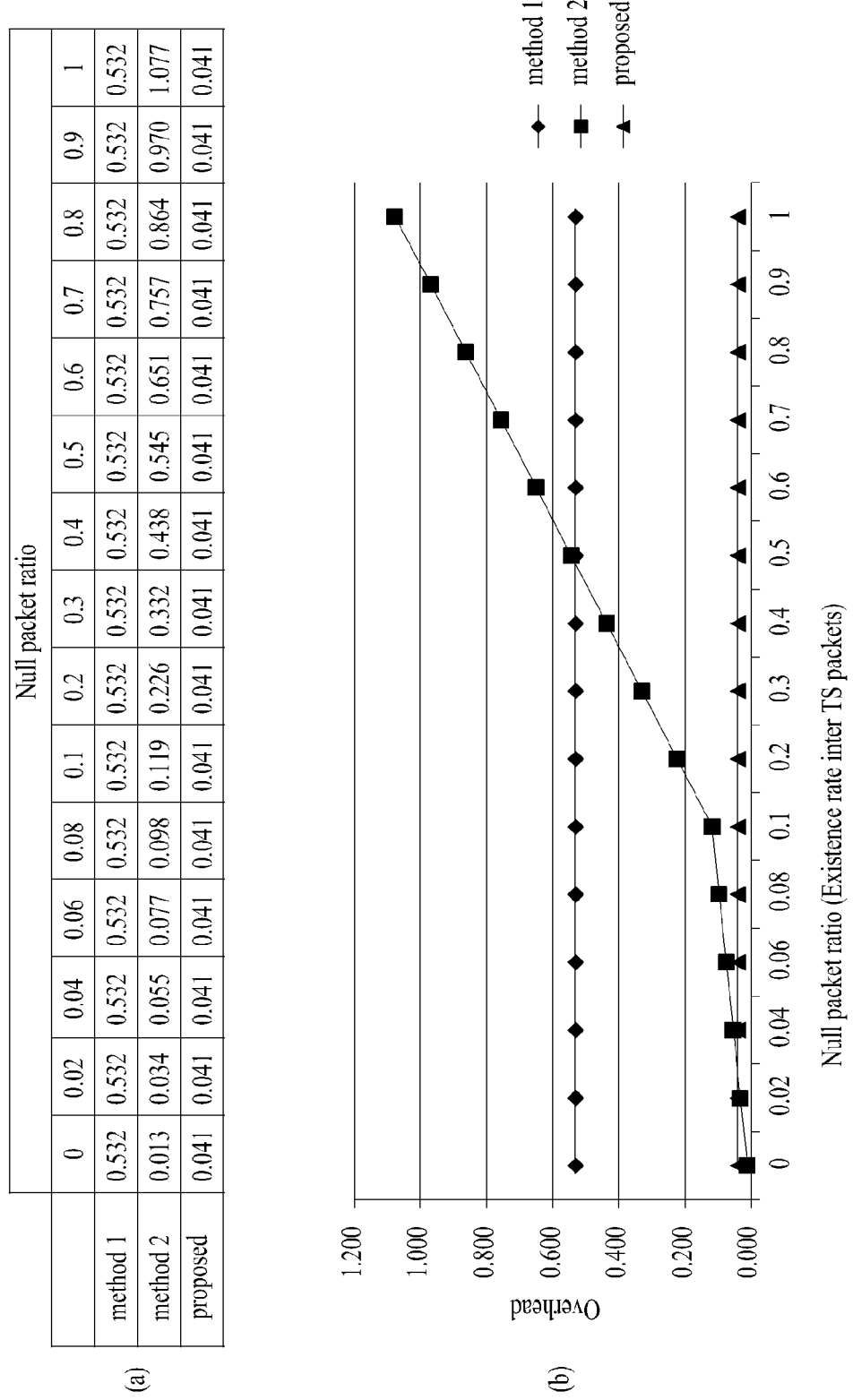
FIG. 27 is a graph showing a null packet ratio and overhead according to an embodiment of the present invention.

FIG. 27 is a graph showing a null packet ratio and overhead according to an embodiment of the present invention.

FIG. 27 is a view illustrating overhead of null packet deletion and, more particularly, overhead required to transmit a TS packet (188 bytes) without a null packet.

Method 1 illustrated in FIG. 27 refers to a conventional method for transmitting 1 byte of DNP with each TS packet when null packet deletion is performed.

Method 2 illustrated in FIG. 27 refers to a conventional method using a header (1 byte) of a BB frame and DNP (1 byte) when null packet deletion is performed. That is, method 2 refers to a DNP_offset method for indicating the number of null packets only when an additional null packet exists.

Proposed refers to the above-described null packet deletion method according to the present invention.

FIG. 27(a) is a table showing overhead of the three methods in % based on a null packet ratio, and FIG. 27(b) is a graph showing the values of FIG. 27(a).

As illustrated in FIG. 27, method 1 always has a value of 0.532% irrespective of the number of null packets and, unlike method 1, method 2 is influenced by the positions of null packets. That is, if a small number of null packets exist between TS packets, method 2 has a smaller overhead value compared to method 1. Otherwise, if a large number of null packets exist between TS packets, method 2 has a larger overhead value compared to method 1.

However, in the above-described null packet deletion method according to the present invention, an overhead value thereof is always smaller than those of method 1 and method 2.

The overhead value of the null packet deletion method according to the present invention is calculated by assuming that one or two PCR cycles (or periods) are included in a BB frame and the BB frame has the maximum length, i.e., 64k. This is variable according to the intention of a designer.

Figure 28:
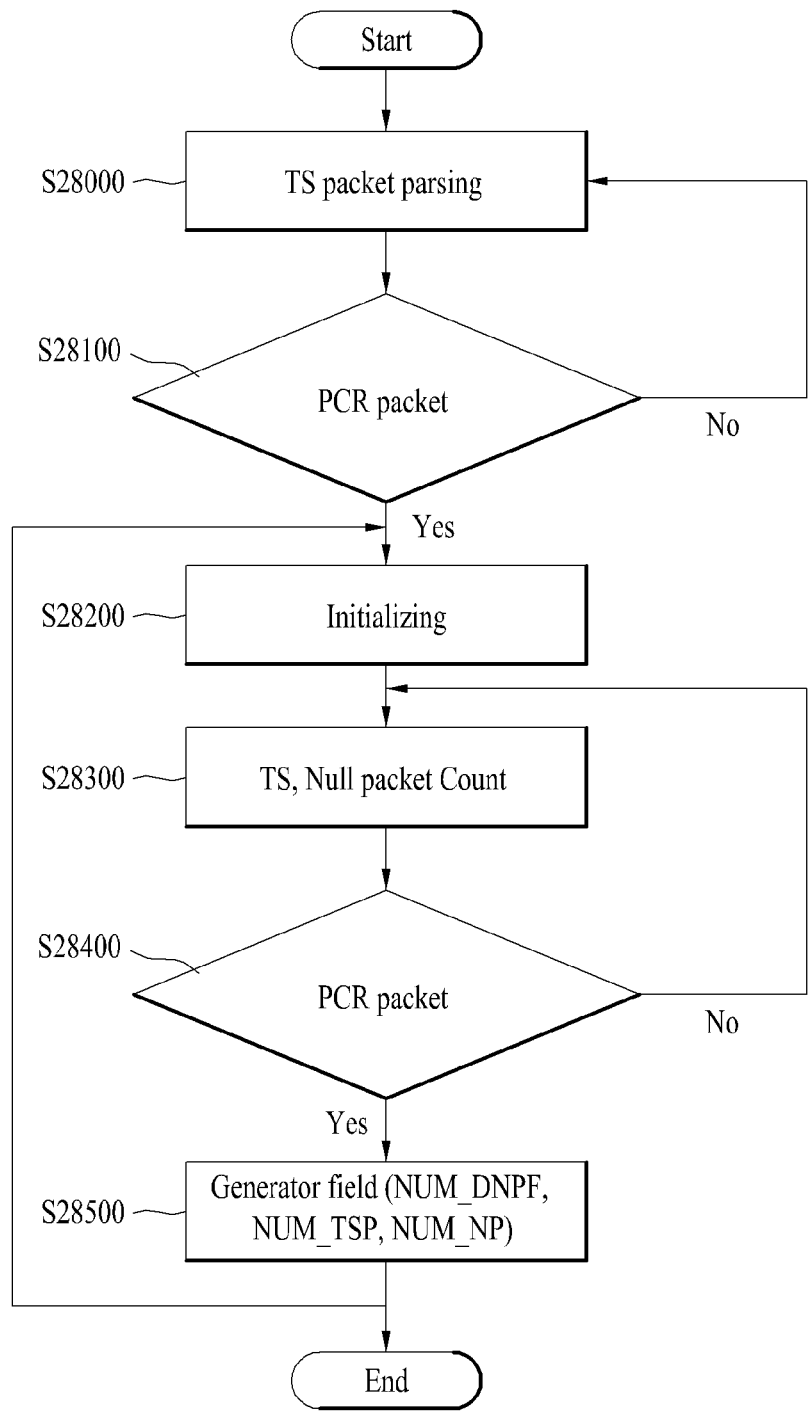
FIG. 28 is a flowchart illustrating operation of a broadcast signal transmission apparatus according to an embodiment of the present invention.

FIG. 28 is a flowchart illustrating operation of a broadcast signal transmission apparatus according to an embodiment of the present invention.

The flowchart illustrated in FIG. 28 may correspond to the operation of the broadcast signal transmission apparatus described above in relation to FIG. 24.

The broadcast signal transmission apparatus or the null packet deletion block 21000 according to an embodiment of the present invention may parse a header of a TS packet when consecutive TS streams are received (S28000).

After that, the broadcast signal transmission apparatus according to an embodiment of the present invention may determine whether the TS packet includes a PCR, i.e., a PCR packet (S28100). As described above, information indicating whether a PCR is included in a TS packet, e.g., PCR_Flag, is included in an adaptation field of a TS packet header. Accordingly, the broadcast signal transmission apparatus according to an embodiment of the present invention may check PCR_Flag included in the adaptation field.

If a PCR packet is not detected, the broadcast signal transmission apparatus according to an embodiment of the present invention may parse a subsequent TS packet (S28000).

If a PCR packet is detected, the broadcast signal transmission apparatus according to an embodiment of the present invention may initialize a data TS packet counter, a null packet counter and the system in every PCR period (S28200), and count the number of subsequently input data TS packets and the number of null packets (S28300). After that, the broadcast signal transmission apparatus according to an embodiment of the present invention may determine whether a subsequently input TS packet is a PCR packet (S28400).

If a PCR packet is not detected as a result of determination, the broadcast signal transmission apparatus according to an embodiment of the present invention may continue to count the number of data TS packets and the number of null packets (S28300).

If a PCR packet is detected as a result of determination, the broadcast signal transmission apparatus according to an embodiment of the present invention may generate fields to be inserted into a BB frame header (S28500). The fields to be inserted into the BB frame header are as described above in relation to FIG. 26 and thus detailed descriptions thereof are omitted here. The generated fields may be transmitted to the above-described BB frame header insertion block 21100. The BB frame header insertion block 21100 may generate a BB frame header including received information about the number of data TS packets and information about the number of null packets.

When a PCR is received again, the broadcast signal transmission apparatus according to an embodiment of the present invention may perform the initialization procedure and then count the number of data TS packets and the number of null packets within the cycle of the received PCR. Therefore, the broadcast signal transmission apparatus according to the present invention may perform null packet deletion more efficiently compared to a conventional null packet deletion method.

Figure 29:
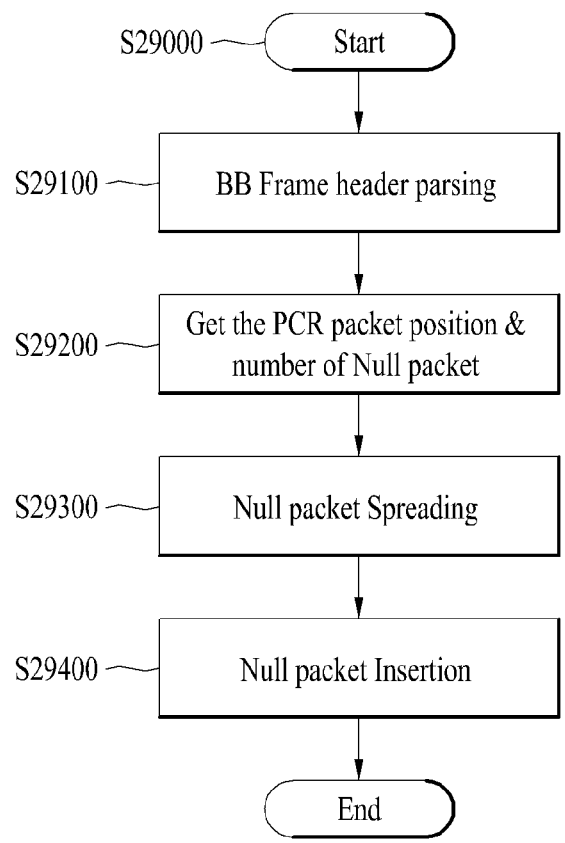
FIG. 29 is a flowchart illustrating operation of a broadcast signal reception apparatus according to an embodiment of the present invention.

FIG. 29 is a flowchart illustrating operation of a broadcast signal reception apparatus according to an embodiment of the present invention.

The flowchart illustrated in FIG. 29 corresponds to a reverse procedure of the operation of the broadcast signal transmission apparatus described above in relation to FIG. 28 and corresponds to the operation of the broadcast signal reception apparatus described above in relation to FIG. 25.

The broadcast signal reception apparatus according to an embodiment of the present invention may parse a received BB frame header (S29000). As such, the broadcast signal reception apparatus according to an embodiment of the present invention may acquire information about the positions of PCR packets, information about the number of data TS packets, information about the number of null packets, etc., which are included in the BB frame header (S29100). The above information is as described above in relation to FIG. 26 and thus a detailed description thereof is omitted here.

After that, the broadcast signal reception apparatus according to an embodiment of the present invention may spread null packets using the acquired information and distribute a remainder sequentially from the first TS packet (S29200). Then, the broadcast signal reception apparatus according to an embodiment of the present invention may insert null packets to corresponding positions (S29300).

Due to the operation of the broadcast signal reception apparatus according to an embodiment of the present invention, null packets may be restored to achieve CBR. In addition, since null packets are evenly spread, a buffer model of a system decoder may be efficiently designed.

Figure 30:
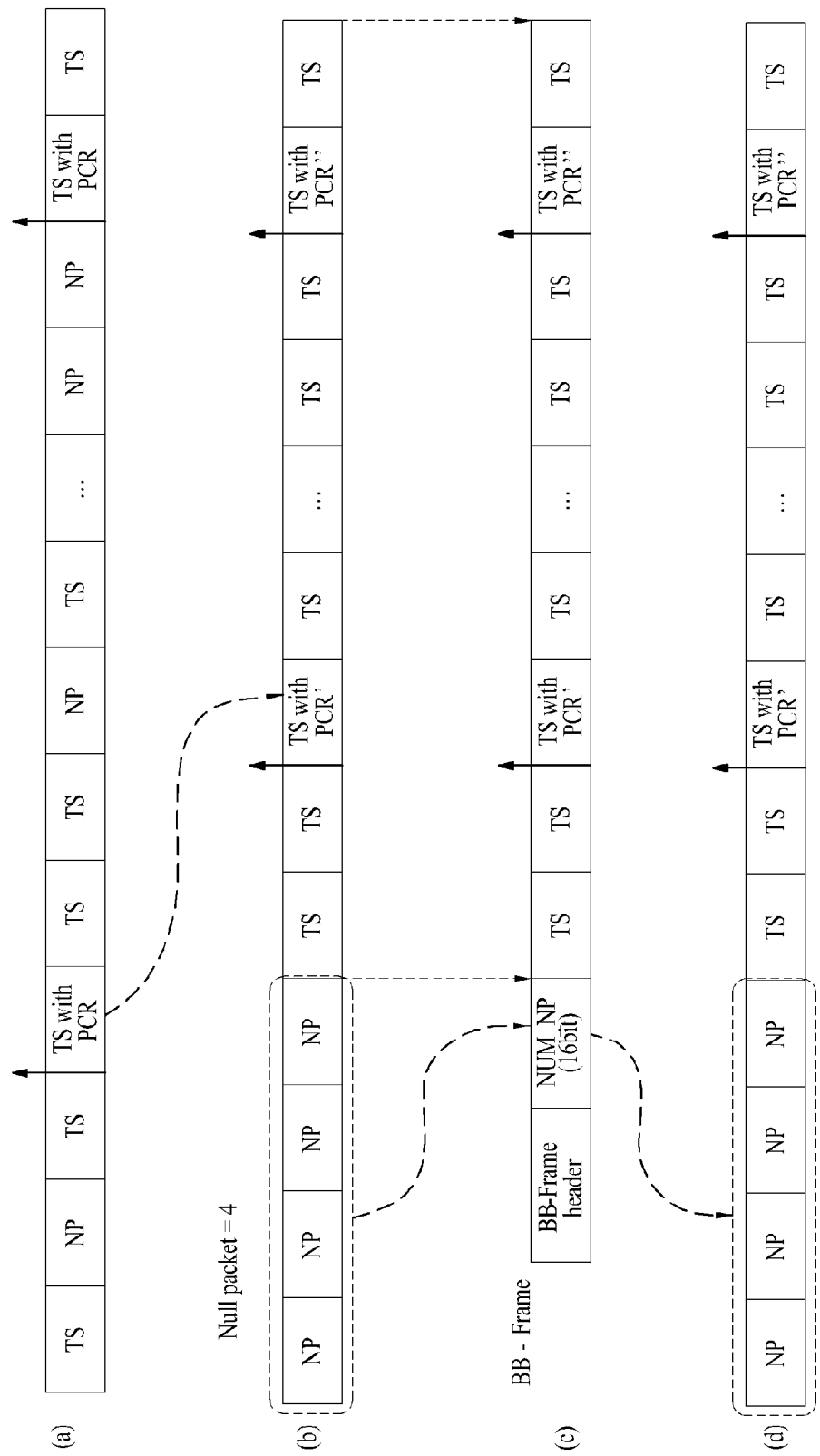
FIG. 30 is a view illustrating a PCR adjusting method according to an embodiment of the present invention.

FIG. 30 is a view illustrating a PCR adjusting method according to an embodiment of the present invention.

A description is now given of a PCR adjusting method for increasing the efficiency of a null packet deletion method according to the present invention.

A PCR adjusting method according to an embodiment of the present invention is a method for gathering all null packets to be input to a BB frame, to a front part of a stream and then adjusting a changed PCR. After that, a broadcast signal transmission apparatus according to an embodiment of the present invention may delete the gathered null packets and transmit information about the number of deleted null packets using a BB frame header. In the PCR adjusting method according to an embodiment of the present invention, since the number of null packets needs to be signaled only once using a BB frame header, transmission efficiency may be increased and a broadcast signal reception apparatus may restore null packets without a complicated procedure.

FIGS. 30($a$) to 30($c$) illustrate operation of the broadcast signal transmission apparatus according to an embodiment of the present invention, and FIG. 30($d$) illustrates operation of the broadcast signal reception apparatus according to an embodiment of the present invention corresponding thereto.

A description is now given of each operation.

FIG. 30($a$) illustrates a procedure for checking PCR packets and counting null packets by the broadcast signal transmission apparatus according to an embodiment of the present invention. As described above, each arrow illustrated in FIG. 30 indicates a PCR period. As illustrated in FIG. 30($a$), a total number of null packets in the corresponding PCR period is 3.

FIG. 30($b$) illustrates a procedure for gathering null packets and performing PCR adjusting by the broadcast signal transmission apparatus according to an embodiment of the present invention. The broadcast signal transmission apparatus according to an embodiment of the present invention may gather a total of 4 null packets including 3 null packets within the PCR period and 1 null packet in front of the PCR period to the very front part of a TS stream and adjust a PCR value.

FIG. 30($c$) illustrates a procedure for deleting all null packets and transmitting information about the number of deleted null packets (NUM_NP) using a BB frame header by the broadcast signal transmission apparatus according to an embodiment of the present invention.

FIG. 30(d) illustrates a procedure for parsing the BB frame header, checking the number of null packets, and then inserting corresponding null packets into the very front part of a TS stream by the broadcast signal reception apparatus according to an embodiment of the present invention. That is, the broadcast signal reception apparatus according to an embodiment of the present invention may insert 4 null packets based on NUM_NP.

Math Figure 2 shows a total number of null packets.

Math FIG. 2

$$N_{NP} = \sum_{i=1}^{N_{PCR}} N_{NP}(i)$$ [Math. 2]

A total number of null packets ($N_{NP}$) is the same as a sum of all null packets in every PCR period (PCR packet).

Math Figure 3 shows the number of PCR adjustments ($N_{adj}$) which should be performed because all null packets move to the front part.

Math FIG. 3

$$N_{adj}(i) = N_{NP} - \sum_{j=1}^{i} N_{NP}(j)$$ [Math. 3]

When all null packets are gathered to the front part as described above, a number of null packets corresponding to a value obtained by subtracting the number of originally existing null packets from the total number of null packets may be added to the front part. Accordingly, the position of a PCR may be adjusted at a rate corresponding to this value.

Figure 31:
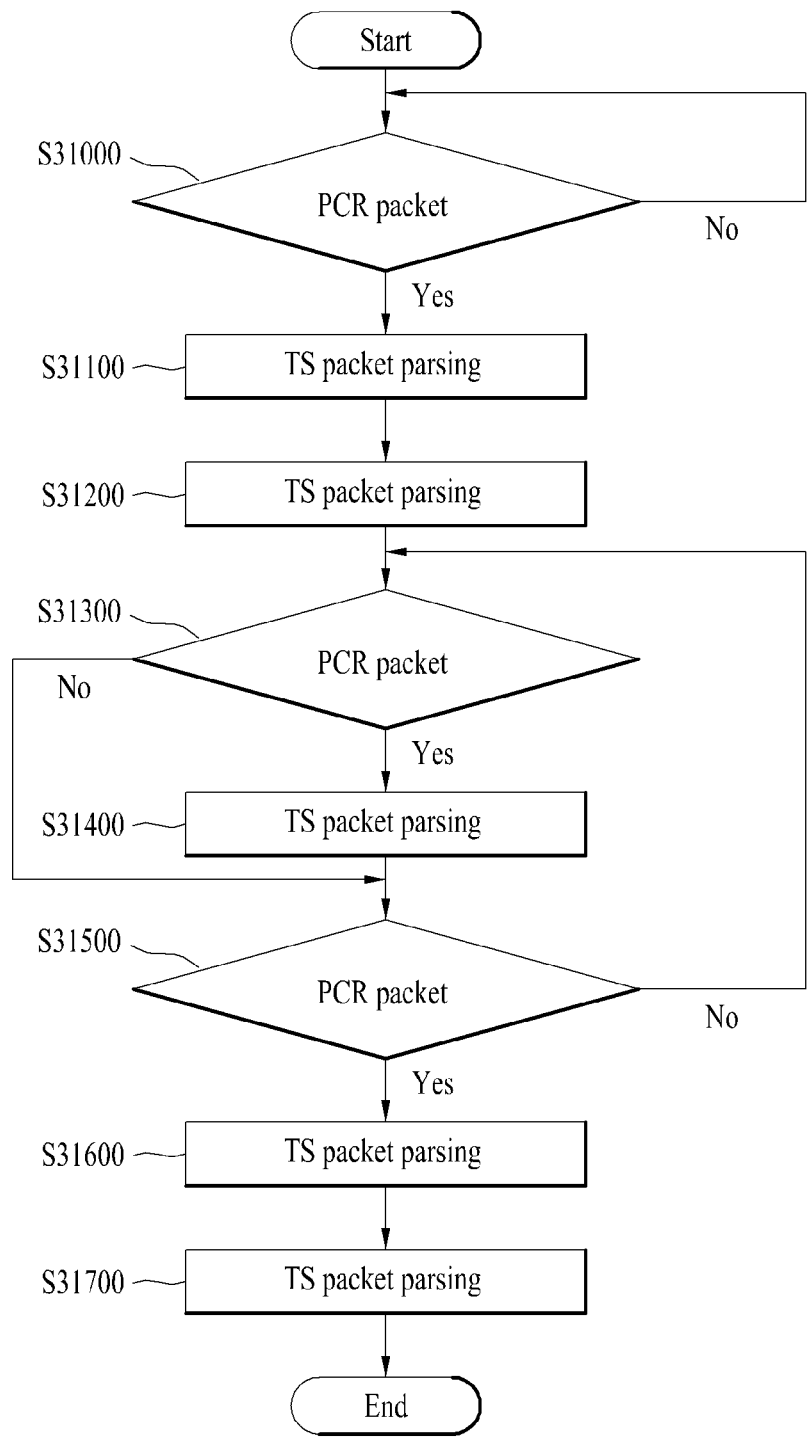
FIG. 31 is a flowchart illustrating operation of a broadcast signal transmission apparatus in a case when a PCR adjusting method according to an embodiment of the present invention is used.

FIG. 31 is a flowchart illustrating operation of a broadcast signal transmission apparatus in a case when a PCR adjusting method according to an embodiment of the present invention is used.

The flowchart illustrated in FIG. 31 corresponds to operation of the broadcast signal transmission apparatus in a case when the PCR adjusting method described above in relation to FIG. 30 is used.

The broadcast signal transmission apparatus according to an embodiment of the present invention may acquire data for generating a payload of a BB frame (S31000). When the corresponding operation is started, the broadcast signal transmission apparatus according to an embodiment of the present invention may initialize all register and counter values (S31100).

After that, the broadcast signal transmission apparatus according to an embodiment of the present invention may receive TS packets and count null packets (S31200). Then, the broadcast signal transmission apparatus according to an embodiment of the present invention may determine whether a PCR packet is received (S31300). If a PCR packet is received as a result of determination, the broadcast signal transmission apparatus according to an embodiment of the present invention may count the number of null packets ($N_{NP}$) corresponding to each PCR packet (i.e., included in each PCR period) (S31400). After that, the broadcast signal transmission apparatus according to an embodiment of the present invention may determine whether the data for generating a payload of a BB frame is completely acquired (S31500). If a PCR packet is not received as a result of determination, the broadcast signal transmission apparatus according to an embodiment of the present invention may directly determine whether the data for generating a payload of a BB frame is completely acquired (S31500).

If the data for generating a payload of a BB frame is not completely acquired, the broadcast signal transmission apparatus according to an embodiment of the present invention may count null packets again (S31200). After that, the broadcast signal transmission apparatus according to an embodiment of the present invention may repeat a series of subsequent operations.

If the data for generating a payload of a BB frame is completely acquired, the broadcast signal transmission apparatus according to an embodiment of the present invention may perform PCR adjustment based on the counted number of null packets (S31600).

After that, the broadcast signal transmission apparatus according to an embodiment of the present invention may perform null packet deletion (S31700). The null packet deletion method is as described above and thus a detailed description thereof is omitted here.

Figure 32:
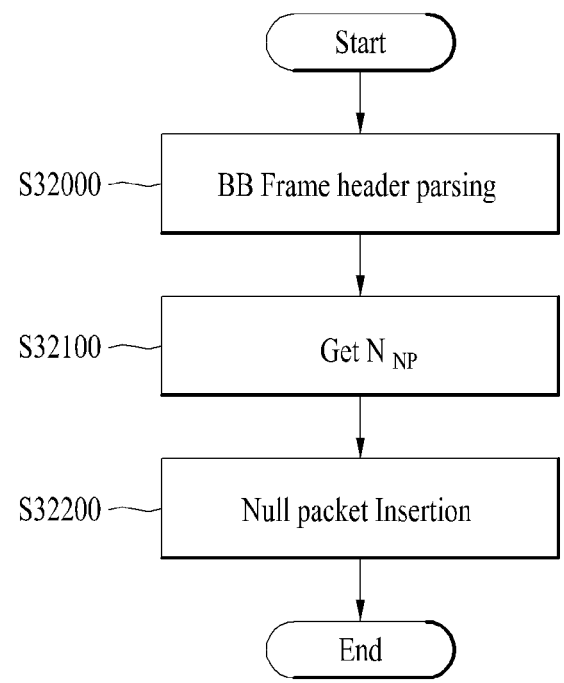
FIG. 32 is a flowchart illustrating operation of a broadcast signal reception apparatus in a case when a PCR adjusting method according to an embodiment of the present invention is used.

FIG. 32 is a flowchart illustrating operation of a broadcast signal reception apparatus in a case when a PCR adjusting method according to an embodiment of the present invention is used.

The flowchart illustrated in FIG. 32 corresponds to a reverse procedure of the operation of the broadcast signal transmission apparatus described above in relation to FIG. 31.

The broadcast signal reception apparatus according to an embodiment of the present invention may parse a BB frame header (S32000). Since the number of null packets deleted based on the PCR adjusting method is signaled using the BB frame header as described above, the broadcast signal reception apparatus according to an embodiment of the present invention may acquire information about the number of deleted null packets ($N_{NP}$) from the parsed BB frame header (S32100).

After that, the broadcast signal reception apparatus according to an embodiment of the present invention may insert deleted null packets (S32200). As such, CBR may be maintained.

Figure 33:
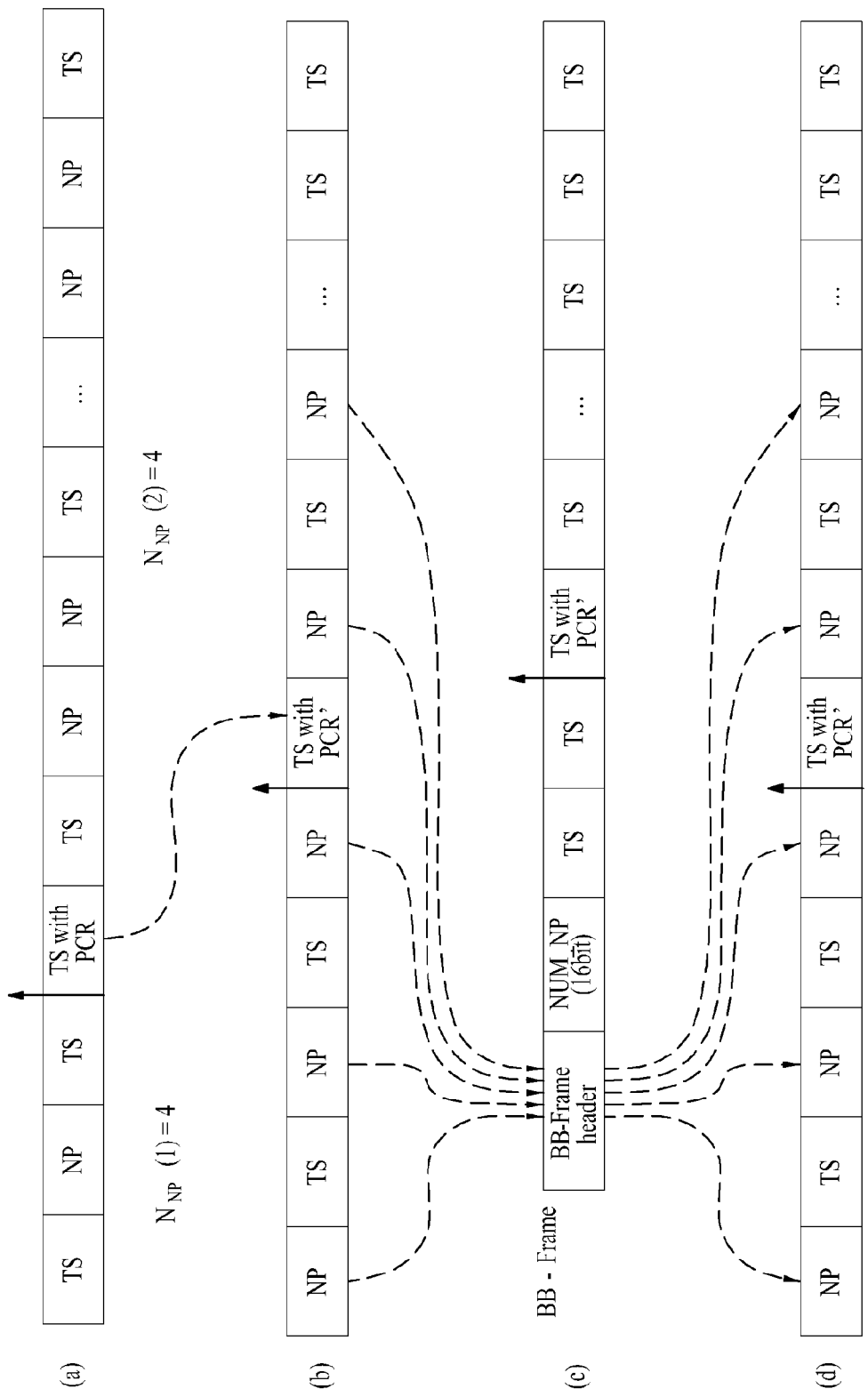
FIG. 33 is a view illustrating a PCR adjusting method according to another embodiment of the present invention.

FIG. 33 is a view illustrating a PCR adjusting method according to another embodiment of the present invention.

Unlike the PCR adjusting method described above in relation to FIG. 30, the PCR adjusting method illustrated in FIG. 33 is a method for spreading null packets based on a preset rule without gathering the null packets to a front part of a TS stream, and then adjusting a PCR. After that, the null packets may be deleted and the number of deleted null packets may be signaled using a BB frame header. The null packet spreading method is as described above and thus a detailed description thereof is omitted here.

FIGS. 33(a) to 33(c) illustrate operation of the broadcast signal transmission apparatus according to an embodiment of the present invention, and FIG. 33(d) illustrates operation of the broadcast signal reception apparatus according to an embodiment of the present invention corresponding thereto.

A description is now given of each operation.

FIG. 33(a) illustrates a procedure for checking PCR packets and counting null packets by the broadcast signal transmission apparatus according to an embodiment of the present invention. As described above, each arrow illustrated in FIG. 33 indicates a PCR period. As illustrated in FIG. 33(a), a total number of null packets in the corresponding PCR period is 4.

FIG. 33(b) illustrates a procedure for spreading null packets based on a preset rule and performing PCR adjusting by the broadcast signal transmission apparatus according to an embodiment of the present invention.

FIG. 33(c) illustrates a procedure for deleting all null packets and transmitting information about the number of deleted null packets (NUM_NP) using a BB frame header by the broadcast signal transmission apparatus according to an embodiment of the present invention.

FIG. 33(d) illustrates a procedure for parsing the BB frame header, checking the number of null packets, and then inserting corresponding null packets by the broadcast signal reception apparatus according to an embodiment of the present invention.

Math Figure 4 shows the number of TS packets in a BB frame.

MathFigure 4

$$N_{TSP} = \lfloor k_{FEC}/L_{TS} \rfloor \quad [\text{Math.4}]$$

$k_{FEC}$: information bit of FEC
$L_{TS}$: TS length (e.g. 188 byte

In Math figure 4, the size of information bits of FEC according to an embodiment of the present invention may be 64k bits (8000 bytes) or 16k bits (2000 bytes), and LTS denotes the length of a TS packet which may be 188 bytes according to an embodiment of the present invention. This is variable according to the intention of a designer.

In addition, 10 to 42 TS packets may be inserted into a BB frame according to an embodiment of the present invention. However, this is variable according to the intention of a designer.

Math Figure 5 shows DNP indicating the number of deleted null packets located subsequently to an ith TS packet with respect to null packets inserted through spreading. As described above, DNP may be inserted to a position from which null packets are deleted.

Math FIG. 5

$$DNP(i) = \begin{cases} \lfloor N_{NP}/N_{TSP} \rfloor + 1, & \text{if } i \le N_{rem} \\ \lfloor N_{NP}/N_{TSP} \rfloor, & \text{if } i > N_{rem} \end{cases} \quad [\text{Math. 5}]$$

where $N_{rem} = N_{NP} - \lfloor N_{NP}/N_{TSP} \rfloor \times N_{TSP}$

As shown in Math Figure 5, when a total number of null packets ($N_{NP}$) is spread subsequently to a total number of data TS packet ($N_{TSP}$), the number of null packets commonly spreadable between data TS packets may be determined by comparing the value of int($N_{NP}/N_{TSP}$) and the value of a remainder ($N_{rem}$). In addition, data TS packets may be additionally aligned from the very front based on the value of the remainder ($N_{rem}$).

Math Figure 6 shows the number of PCR adjustments (N).

Math FIG. 6

$$N_{adj}(i) = \sum_{j=1}^{index(PCR(i))} DNP(j) - \sum_{j=1}^{i} N_{NP}(j) \quad [\text{Math. 6}]$$

As shown in Math Figure 6, since a number of null packets corresponding to a value obtained by subtracting the number of originally existing null packets from the number of newly spread null packets are added or reduced in front of each PCR packet, the position of the PCR packet may be adjusted backward or forward at a rate corresponding to this value.

Figure 34:
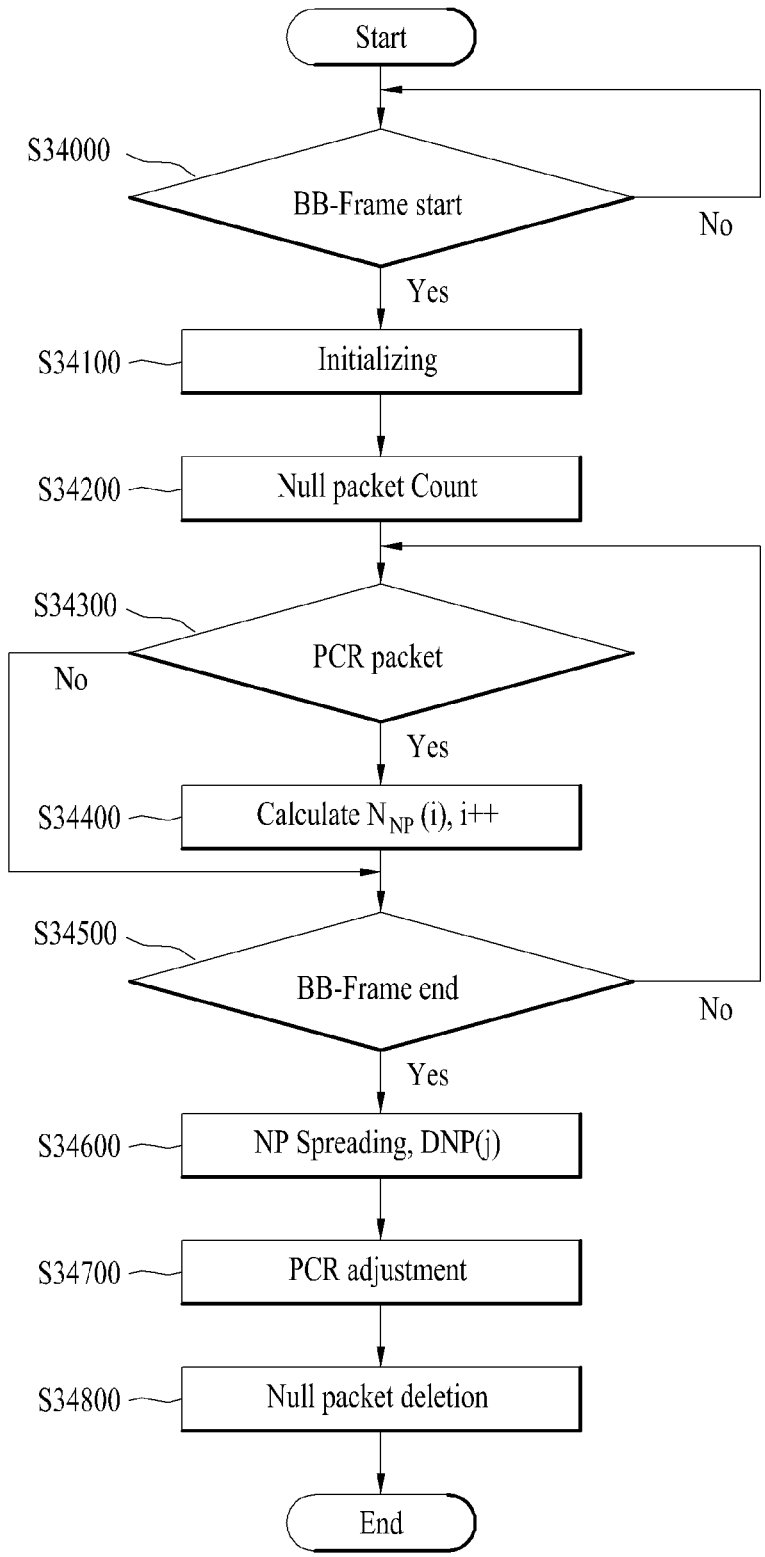
FIG. 34 is a flowchart illustrating operation of a broadcast signal transmission apparatus in a case when a PCR adjusting method according to another embodiment of the present invention is used.

FIG. 34 is a flowchart illustrating operation of a broadcast signal transmission apparatus in a case when a PCR adjusting method according to another embodiment of the present invention is used.

The flowchart illustrated in FIG. 34 corresponds to operation of the broadcast signal transmission apparatus in a case when the PCR adjusting method described above in relation to FIG. 33 is used.

The broadcast signal transmission apparatus according to an embodiment of the present invention may acquire data for generating a payload of a BB frame (S34000). When the corresponding operation is started, the broadcast signal transmission apparatus according to an embodiment of the present invention may initialize all register and counter values (S34100).

After that, the broadcast signal transmission apparatus according to an embodiment of the present invention may receive TS packets and count null packets (S34200). Then, the broadcast signal transmission apparatus according to an embodiment of the present invention may determine whether a PCR packet is received (S34300). If a PCR packet is received as a result of determination, the broadcast signal transmission apparatus according to an embodiment of the present invention may count the number of null packets ($N_{NP}$) corresponding to each PCR packet (i.e., included in each PCR period) (S34400). After that, the broadcast signal transmission apparatus according to an embodiment of the present invention may determine whether the data for generating a payload of a BB frame is completely acquired (S34500). If a PCR packet is not received as a result of determination, the broadcast signal transmission apparatus according to an embodiment of the present invention may directly determine whether the data for generating a payload of a BB frame is completely acquired (S34500).

If the data for generating a payload of a BB frame is not completely acquired, the broadcast signal transmission apparatus according to an embodiment of the present invention may count null packets again (S34200). After that, the broadcast signal transmission apparatus according to an embodiment of the present invention may repeat a series of subsequent operations.

If the data for generating a payload of a BB frame is completely acquired, the broadcast signal transmission apparatus according to an embodiment of the present invention may perform null packet spreading based on the counted number of null packets and calculate a DNP value (S34600).

After that, the broadcast signal transmission apparatus according to an embodiment of the present invention may perform PCR adjustment using the DNP value (S34700), and perform null packet deletion (S34800). The null packet deletion method is as described above and thus a detailed description thereof is omitted here.

Figure 35:
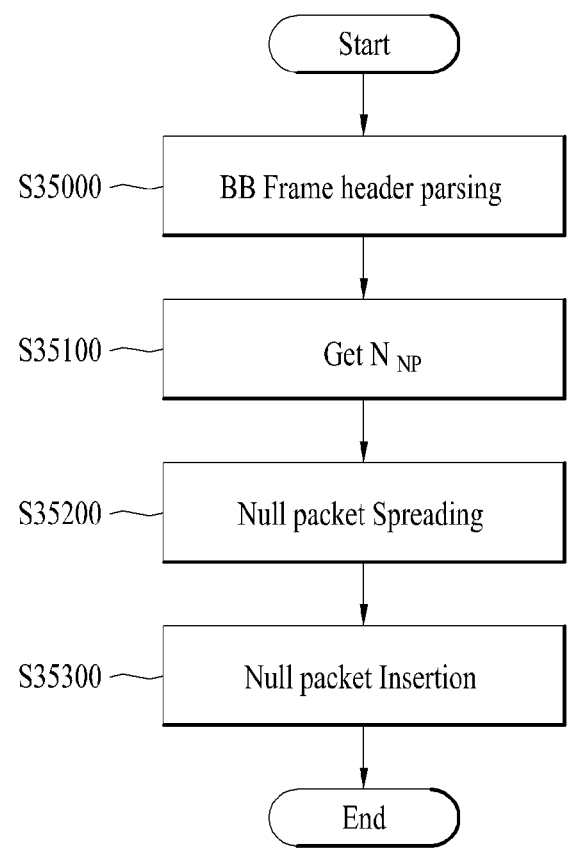
FIG. 35 is a flowchart illustrating operation of a broadcast signal reception apparatus in a case when a PCR adjusting method according to another embodiment of the present invention is used.

FIG. 35 is a flowchart illustrating operation of a broadcast signal reception apparatus in a case when a PCR adjusting method according to another embodiment of the present invention is used.

The flowchart illustrated in FIG. 35 corresponds to a reverse procedure of the operation of the broadcast signal transmission apparatus described above in relation to FIG. 34.

The broadcast signal reception apparatus according to an embodiment of the present invention may parse a BB frame header (S35000). Since the number of null packets deleted based on the PCR adjusting method is signaled using the BB frame header as described above, the broadcast signal reception apparatus according to an embodiment of the present invention may acquire information about the number of deleted null packets ($N_{NP}$) from the parsed BB frame header (S35100).

After that, the broadcast signal reception apparatus according to an embodiment of the present invention may spread deleted null packets (S35200) and insert deleted null packets (S35300). As such, CBR may be maintained.

Figure 36:
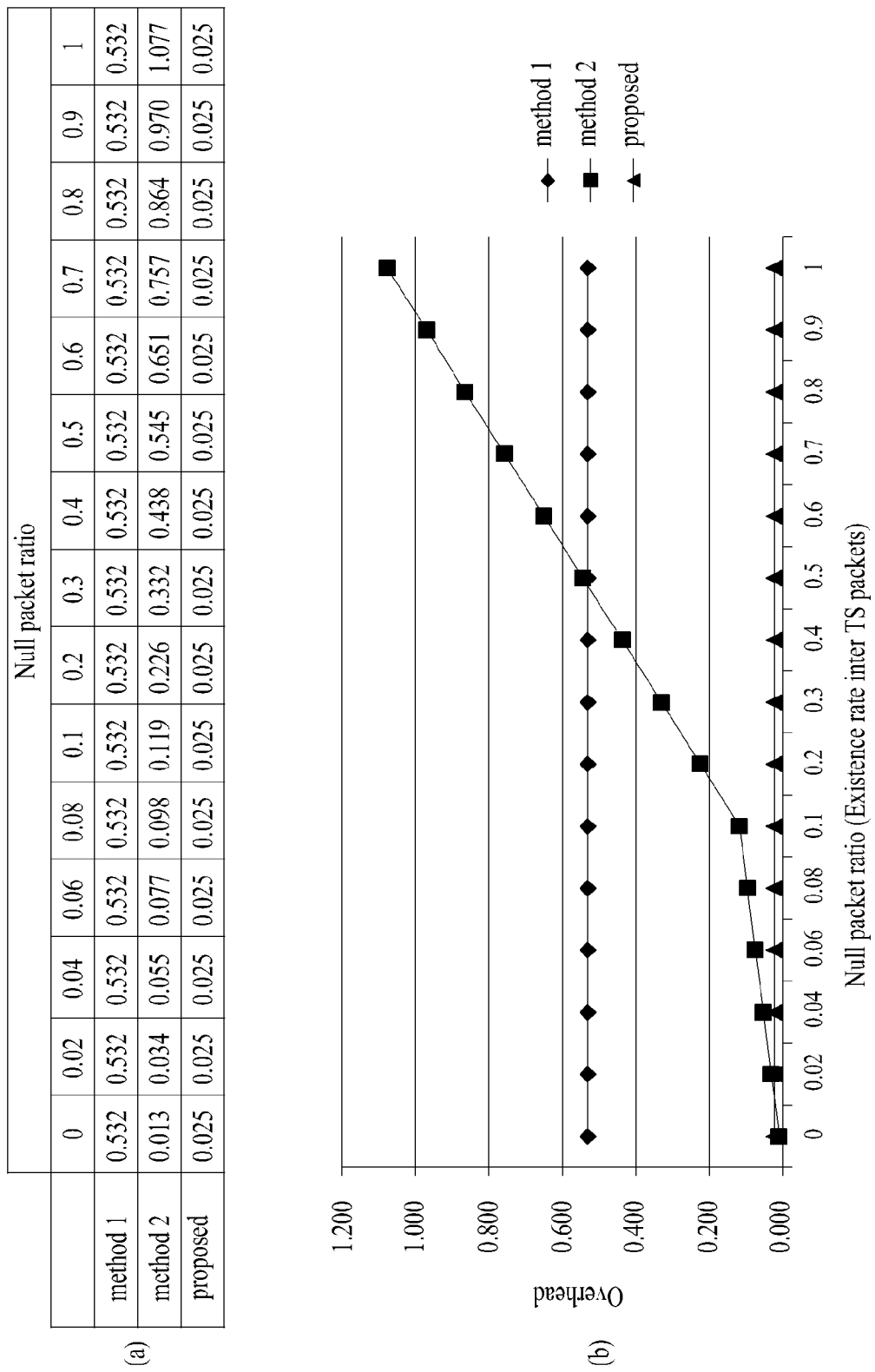
FIG. 36 is a graph showing a null packet ratio and overhead according to another embodiment of the present invention.

FIG. 36 is a graph showing a null packet ratio and overhead according to another embodiment of the present invention.

FIG. 36 is a view illustrating overhead of null packet deletion and, more particularly, overhead required to transmit a TS packet (188 bytes) without a null packet.

Method 1 illustrated in FIG. 36 refers to a conventional method for transmitting 1 byte of DNP with each TS packet when null packet deletion is performed.

Method 2 illustrated in FIG. 36 refers to a conventional method using a header (1 byte) of a BB frame and DNP (1 byte) when null packet deletion is performed. That is, method 2 refers to a DNP_offset method for indicating the number of null packets only when an additional null packet exists.

Proposed refers to the above-described null packet deletion method using PCR adjustment according to the present invention.

FIG. 36(*a*) is a table showing overhead of the three methods in % based on a null packet ratio, and FIG. 36(*b*) is a graph showing the values of FIG. 36(*a*).

As illustrated in FIG. 36, method 1 always has a value of 0.532% irrespective of the number of null packets and, unlike method 1, method 2 is influenced by the positions of null packets. That is, if a small number of null packets exist between TS packets, method 2 has a smaller overhead value compared to method 1. Otherwise, if a large number of null packets exist between TS packets, method 2 has a larger overhead value compared to method 1.

However, in the above-described null packet deletion method according to the present invention, an overhead value thereof is always smaller than those of method 1 and method 2.

The overhead value of the null packet deletion method according to the present invention is calculated by assuming that a 16-bit header is additionally inserted into a BB frame and the BB frame has the maximum length, i.e., 64k. This is variable according to the intention of a designer.

Figure 37:
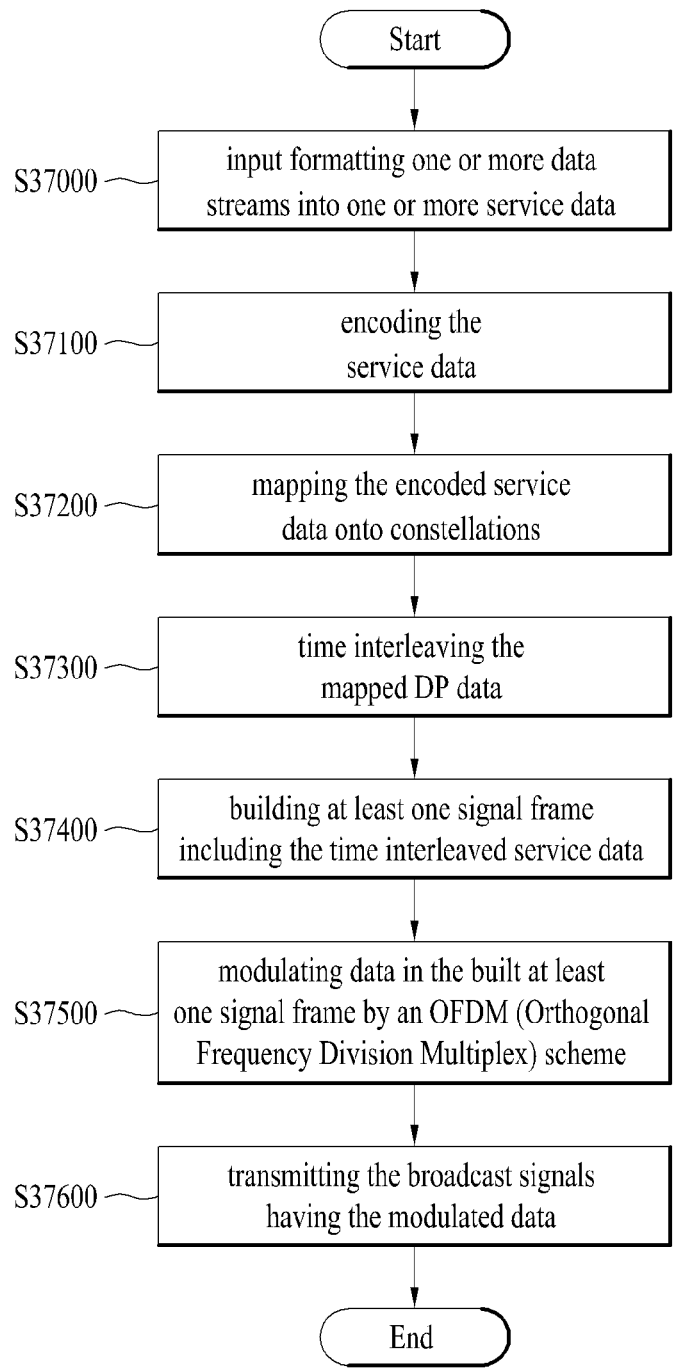
FIG. 37 is a flowchart illustrating a method for transmitting broadcast signals according to an embodiment of the present invention.

FIG. 37 is a flowchart illustrating a method for transmitting broadcast signals according to an embodiment of the present invention.

The apparatus for transmitting broadcast signals according to an embodiment of the present invention can format one or more data streams to output one or more service data. As described above, service data is transmitted through a data pipe which is a logical channel in the physical layer that carries service data or related metadata, which may carry one or multiple service(s) or service component(s). Data carried on a data pipe can be referred to as DP data or service data. Also, the apparatus for transmitting broadcast signals according to an embodiment of the present invention further deletes at least one null packet in each of the one or more data streams and inserts DNP information instead of the deleted null packets. The detail process of step S37000 is as described in FIGS. 16 to 36.

The apparatus for transmitting broadcast signals according to an embodiment of the present invention can encode the service data (S37100). The detailed process of this step is as described in FIG. 1, 5 or 14.

The apparatus for transmitting broadcast signals according to an embodiment of the present invention can map the encoded service data onto constellations (S37200). The detailed process of this step is as described in FIG. 1, 5 or 14.

Then, the apparatus for transmitting broadcast signals according to an embodiment of the present invention can time-interleave the mapped service data (S37300).

Subsequently, the apparatus for transmitting broadcast signals according to an embodiment of the present invention can build at least on signal frame including the time-interleaved service data (S37400). The detailed process of this step is as described in FIG. 1 or 6.

The apparatus for transmitting broadcast signals according to an embodiment of the present invention can modulate data included in the built signal frame using an OFDM scheme (S37500). The detailed process of this step is as described in FIG. 1 or 7.

The apparatus for transmitting broadcast signals according to an embodiment of the present invention can transmit broadcast signals including the signal frame (S37600). The detailed process of this step is as described in FIG. 1 or 7.

Figure 38:
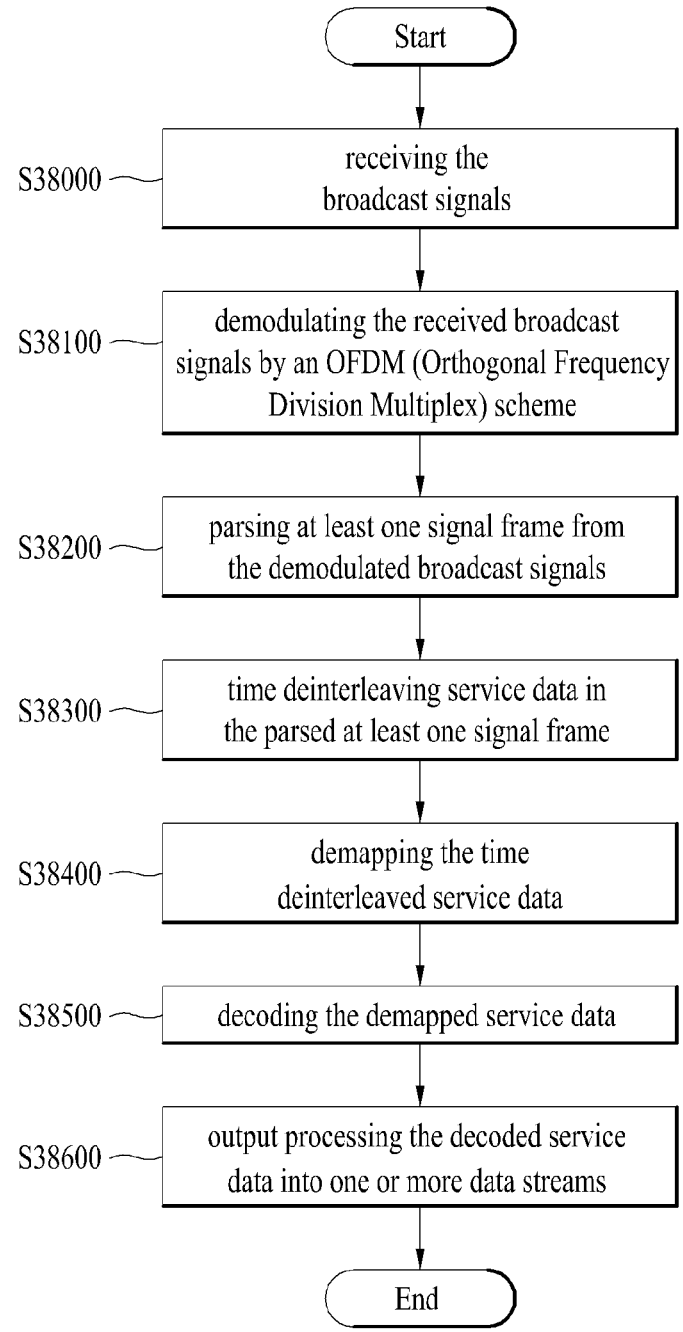
FIG. 38 is a flowchart illustrating a method for receiving broadcast signals according to an embodiment of the present invention.

FIG. 38 is a flowchart illustrating a method for receiving broadcast signals according to an embodiment of the present invention.

The flowchart shown in FIG. 38 corresponds to a reverse process of the broadcast signal transmission method according to an embodiment of the present invention, described with reference to FIG. 37.

The apparatus for receiving broadcast signals according to an embodiment of the present invention can receive broadcast signals (S38000) and demodulate received broadcast signals using an OFDM scheme (S38100). Details are as described in FIG. 8 or 9.

The apparatus for receiving broadcast signals according to an embodiment of the present invention can parse at least one signal frame from the demodulated broadcast signals (S38200). Details are as described in FIG. 8 or 10.

Subsequently, the apparatus for receiving broadcast signals according to an embodiment of the present invention can time-deinterleave service data included in the parsed signal frame (S38300).

Then, the apparatus for receiving broadcast signals according to an embodiment of the present invention can demap the time-deinterleaved service data (S38400). Details are as described in FIG. 8 or 11 and FIG. 15.

The apparatus for receiving broadcast signals according to an embodiment of the present invention can decode the demapped DP data (S38500). Details are as described in FIG. 8 or 11 and FIG. 15.

The apparatus for receiving broadcast signals according to an embodiment of the present invention can output process the decoded service data (S38600). More specifically, the apparatus for receiving broadcast signals according to an embodiment of the present invention may obtain DNP information indicating a number of null packets and insert null packets according to the obtained DNP information. Details are as described in FIGS. 16 to 36.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

MODE FOR THE INVENTION

Various embodiments have been described in the best mode for carrying out the invention.

INDUSTRIAL APPLICABILITY

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for transmitting broadcast signals, the method comprising:
input formatting input streams into one or more PLP (Physical Layer Pipe) data, wherein the input formatting further includes:
deleting at least one null packet in each of the input streams, wherein the at least one null packet is multiplexed with input packets,
inserting DNP (deleted null packet) information indicating a number of the deleted at least one null packet in front of the input packets, and
generating a BB (Base Band) frame corresponding to the PLP data by using the input packets and the inserted DNP information and inserting additional header information in front of a payload of the BB frame;
encoding the PLP data;
mapping the encoded PLP data onto constellations:
time interleaving the mapped PLP data;
building at least one signal frame including the time interleaved PLP data;
modulating data in the built at least one signal frame by an OFDM (Orthogonal Frequency Division Multiplex) scheme; and
transmitting the broadcast signals having the modulated data,
wherein the input formatting further includes counting null packets and input packets in a TS packet group in an input stream by using a NP (Null Packet) counter and a TS (Transport Stream) counter, respectively,
wherein a value of the NP counter is incremented for each counted null packet and a value of the TS counter is incremented for each counted input packet in the TS packet group, and
wherein the NP counter is initialized before the counting.

2. The method of claim 1, wherein the TS counter is initialized before the counting.

3. The method of claim 1, wherein the input formatting further includes checking whether sync reference information exists in the each of the input streams and determining the TS packet group in the input stream.

4. The method of claim 3, wherein the input formatting further includes spreading the null packets in the TS packet group using the value of the TS counter and the value of the NP counter.

5. The method of claim 4, wherein a value of the DNP information is recalculated according to the spreading.

6. An apparatus for transmitting broadcast signals, the apparatus comprising:
an input formatter configured to input format input streams into one or more PLP (Physical layer Pipe) data, wherein the input formatter further includes:
a stream processor configured to delete at least one null packet in each of the input streams, wherein the at least one null packet is multiplexed with input packets, and
a generator configured to insert DNP (deleted null packet) information indicating a number of the deleted at least one null packet in front of the input packets and generate a BB (Base Band) frame corresponding to the PLP data by using the input packets and the inserted DNP information and inserting additional header information in front of a payload of the BB frame;
an encoder configured to encode the PLP data;
a mapper configured to map the encoded PLP data onto constellations;
a time interleaver configured to time interleave the mapped PLP data;
a frame builder configured to build at least one signal frame including the time interleaved PLP data;
a modulator configured to modulate data in the built at least one signal frame by an OFDM (Orthogonal Frequency Division Multiplex) scheme; and
a transmitter configured to transmit the broadcast signals having the modulated data,
wherein the input formatter further counts null packets and input packets in a TS packet group in an input stream by using a NP (Null Packet) counter and a TS (Transport Stream) counter, respectively,
wherein a value of the NP counter is incremented for each counted null packet and a value of the TS counter is incremented for each counted input packet in the TS packet group, and
wherein the NP counter is initialized before the counting.

7. The apparatus of claim 6, wherein the TS counter is initialized before the counting.

8. The apparatus of claim 6, wherein the input formatter is further configured to check whether sync reference information exists in the each of the streams and determines the TS packet group in the input stream.

9. The apparatus of claim 8, wherein the input formatter is further configured to spread the null packets in the TS packet group using the value of the TS counter and the value of the NP counter.

10. The apparatus of claim 9, wherein a value of the DNP information is recalculated according to the spreading.

* * * * *